(12) United States Patent
Elizondo, II

(10) Patent No.: US 10,019,694 B2
(45) Date of Patent: Jul. 10, 2018

(54) RFID READ SYSTEM FOR VERIFYING THE CONTENTS OF ITEMS IN TRAY POCKETS

(71) Applicant: MEPS Real-Time, Inc., Carlsbad, CA (US)

(72) Inventor: Paul M. Elizondo, II, Escondido, CA (US)

(73) Assignee: MEPS Real-Time, Inc., Carlsbad, CA (US)

( * ) Notice: Subject to any disclaimer, the term of this patent is extended or adjusted under 35 U.S.C. 154(b) by 0 days.

(21) Appl. No.: 15/476,564

(22) Filed: Mar. 31, 2017

(65) Prior Publication Data

US 2017/0286903 A1    Oct. 5, 2017

Related U.S. Application Data

(60) Provisional application No. 62/317,430, filed on Apr. 1, 2016.

(51) Int. Cl.
| | |
|---|---|
| *G06F 19/00* | (2018.01) |
| *G06Q 30/00* | (2012.01) |
| *G06Q 10/08* | (2012.01) |
| *H04B 17/318* | (2015.01) |
| *G06K 19/077* | (2006.01) |
| *G06K 7/14* | (2006.01) |
| *G06K 19/06* | (2006.01) |
| *G06K 7/10* | (2006.01) |

(52) U.S. Cl.
CPC ....... *G06Q 10/087* (2013.01); *G06K 7/10316* (2013.01); *G06K 7/1413* (2013.01); *G06K 19/06028* (2013.01); *G06K 19/07758* (2013.01); *H04B 17/318* (2015.01)

(58) Field of Classification Search
USPC ................. 235/375, 385, 451, 492
See application file for complete search history.

(56) References Cited

U.S. PATENT DOCUMENTS

| | | | |
|---|---|---|---|
| 8,318,499 B2 * | 11/2012 | Fritchie ............ | G01N 35/00732 422/50 |
| 8,749,356 B2 * | 6/2014 | Hussain ........... | G06K 19/07749 340/10.1 |
| 8,770,479 B1 * | 7/2014 | Shoenfeld .............. | G06Q 90/00 235/375 |
| 9,230,250 B1 * | 1/2016 | Parker .................. | G06Q 20/203 |

(Continued)

*Primary Examiner* — Tuyen K Vo
(74) *Attorney, Agent, or Firm* — Thomas A. Runk; Brooks Kushman P.C.

(57) ABSTRACT

An inventory tracking system to determine the location of an article labeled with an RFID tag in a pocket of a container having a plurality of pockets. The system includes an antenna device that transmits a radiation beam into a pocket to read data from tagged articles. The antenna device includes a first antenna that transmits a beam at the pocket and a second antenna co-located with the first antenna. The second antenna transmits a beam with a predetermined null area oriented to overlap the first antenna's beam at the pocket. In another embodiment, the antenna device includes an antenna that transmits a beam through an antenna gateway device having openings switchable to operable or inoperable states aligned with each pocket. An RFID reader receives the read data from responding tagged articles, and a processor uses the read data to determine whether an article is in a particular pocket.

20 Claims, 22 Drawing Sheets

(56) References Cited

U.S. PATENT DOCUMENTS

| | | | | |
|---|---|---|---|---|
| 9,268,978 | B2* | 2/2016 | Hussain | G06K 7/10178 |
| 2007/0046552 | A1* | 3/2007 | Marino | G06Q 10/08 |
| | | | | 343/720 |
| 2008/0052037 | A1* | 2/2008 | Bodin | G06Q 10/087 |
| | | | | 702/173 |
| 2010/0097184 | A1* | 4/2010 | Bauchot | G06K 7/10079 |
| | | | | 340/10.1 |
| 2012/0123587 | A1* | 5/2012 | Mockus | G07F 11/00 |
| | | | | 700/230 |
| 2013/0282392 | A1* | 10/2013 | Wurm | G06Q 50/22 |
| | | | | 705/2 |
| 2014/0138440 | A1* | 5/2014 | D'Ambrosio | G06Q 10/087 |
| | | | | 235/385 |
| 2016/0232386 | A1* | 8/2016 | Sehmer | G06K 7/10316 |

\* cited by examiner

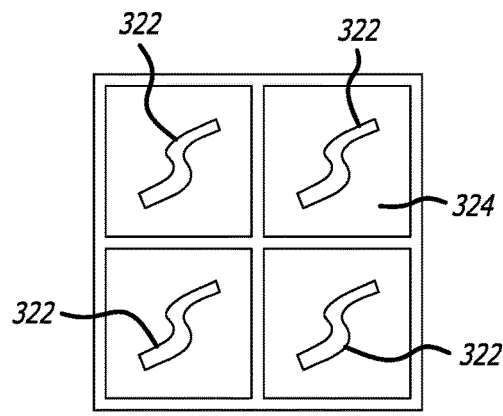
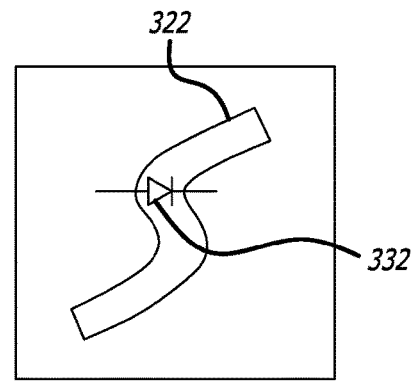
FIG. 29　　　　FIG. 30
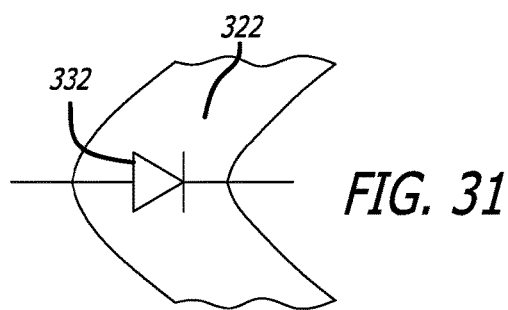
FIG. 31
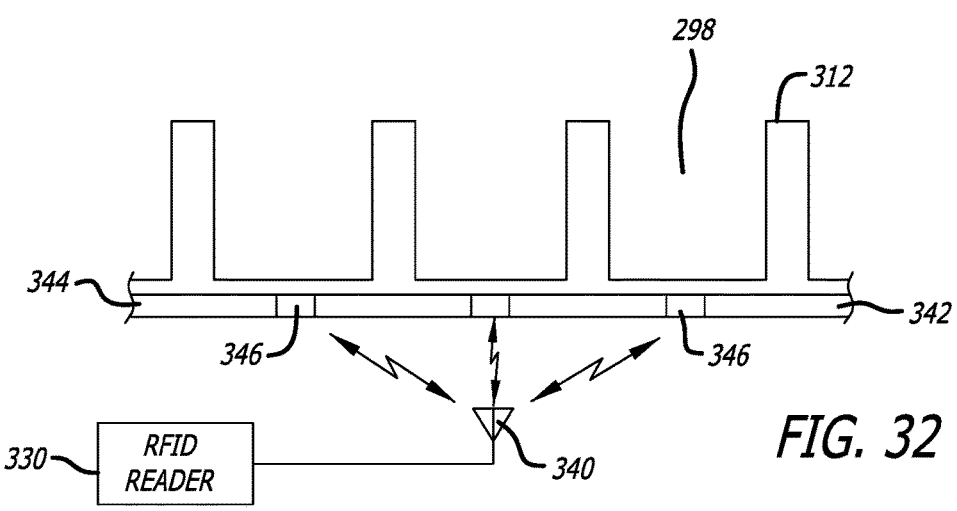
FIG. 32

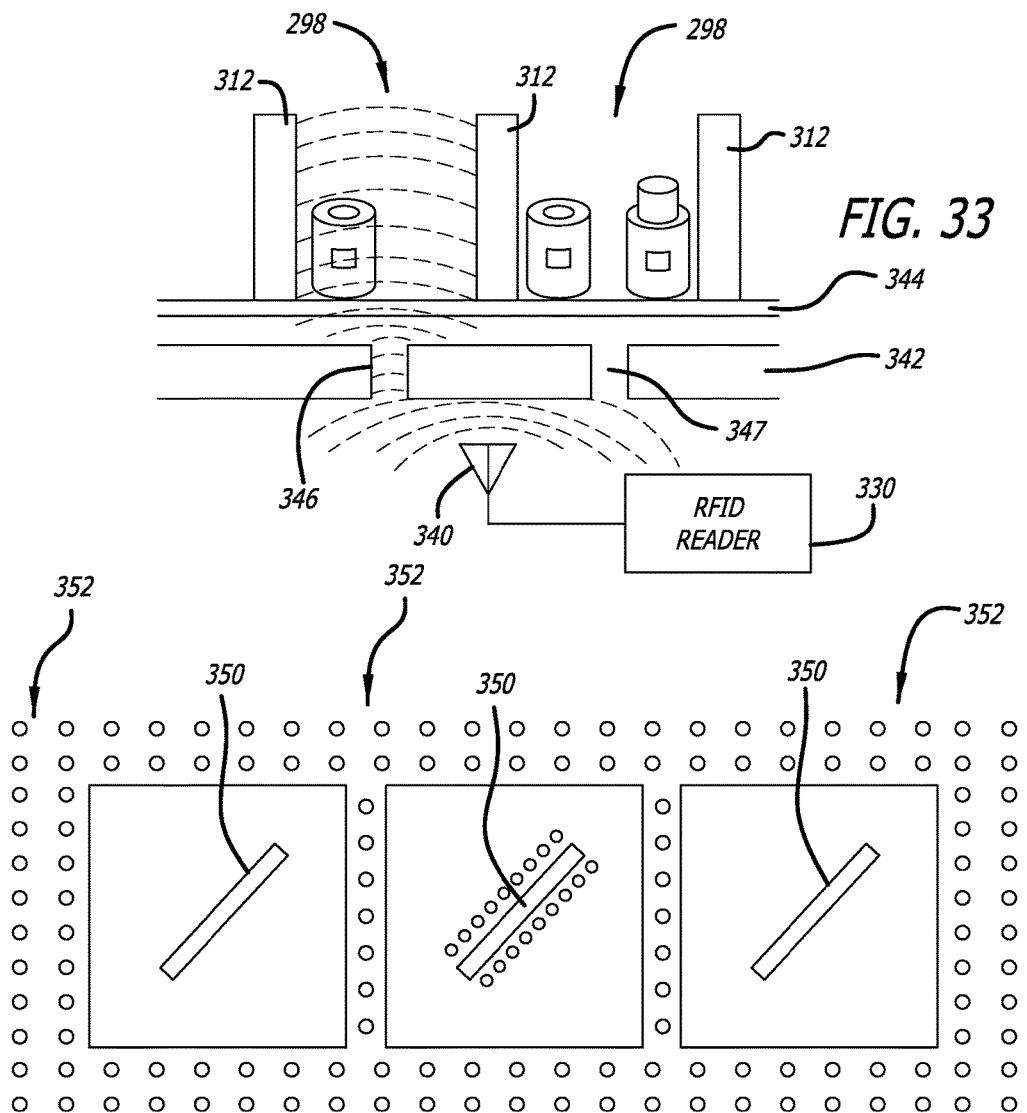
FIG. 33
FIG. 34
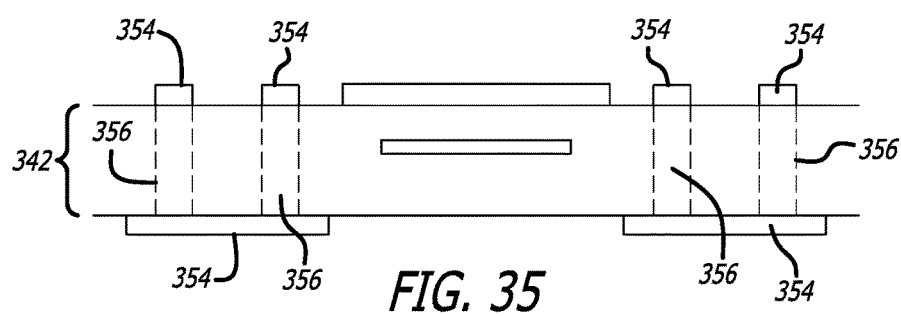
FIG. 35

RFID READ SYSTEM FOR VERIFYING THE CONTENTS OF ITEMS IN TRAY POCKETS

CROSS-REFERENCE TO RELATED APPLICATIONS

This application claims the benefit of U.S. provisional Application No. 62/317,430 filed Apr. 1, 2016, the disclosure of which is hereby incorporated in its entirety by reference herein.

BACKGROUND

The invention relates generally to the field of wireless identification of medical articles in a healthcare setting, and more particularly, to a system and method for the automatic and wireless tracking of inventory located in the pockets of medical article containers.

In the healthcare setting, particularly in healthcare facilities, healthcare practitioners ("HCPs") need to have medications and other medical articles on hand to manage the treatment of patients suffering from a wide variety of ailments. To supply such articles for patient use, various medical administration methods and devices are used. A wide variety of containers has been adapted to store medical articles. One such container is an automated dispensing cabinet ("ADC") having drawers or shelves in which medical articles, including medications, are stored for administration. Another container for providing medical articles is a tray or "code tray" which typically has multiple partitions forming "pockets" in which medical articles are placed. These trays often have a predetermined inventory with predetermined placement of each article of that inventory in respective locations in the tray. The trays are often stocked for particular purposes, such as for a surgery unit, an intensive care unit, a pediatric unit, emergency care unit, and others. In addition to the stocking of the trays and the specific location of medical articles in certain positions in those trays, ADCs and other dispensing containers also often contain medical articles that are placed in particular positions or in particular pockets of the container. This makes retrieving the needed medical article faster and more efficient since the HCP knows exactly where to look for a particular medical article in the container.

As used herein, a "medical article" is meant to refer to a wide variety of medical products, including but not limited to medications, syringes, bandages, tape, clamps, thermometers, and many other articles. As also used herein, a "container" is meant to refer to a device in which is stored medical articles. A "container" includes, but is not limited to, an ADC, the drawer of an ADC, a refrigerator, a tray, a kit, a cart, and a box.

Typically, a pharmacy is responsible for stocking dispensing containers with the required number and type of medical articles and for placing those stocked medical articles in the dispensing container in specified locations, as applicable. For example, a pharmacy stocks an ADC located at a surgical site or elsewhere in a healthcare facility, or stocks a tray and then ships the stocked tray to a particular location in a healthcare facility for use. The pharmacy is also responsible for verifying that the medications placed in a container are not expired or recalled or otherwise compromised.

Existing systems for identifying medical articles in a dispensing container include the manual-labor system in which a person visually looks in a dispensing container and reads the labels of the medical articles found. The labels have information that typically includes identification of the medical article, dose, and expiration date. The person then compares the medical articles he or she sees in the container to a list of what should be in the container and where they should be placed, if applicable. If the viewer finds any errors in the dispensing container, changes must be made to correct those errors. A more automated system is to have a bar code adhered to each medical article in the dispensing container. The person in charge of inventory tracking scans each article with a bar code reader and compares what the reader finds to a list of required articles for that dispensing device. Although the use of bar code labels increases the accuracy and efficiency of identification of a medical article, the system is manual in nature and requires that each article be manipulated so that its bar code can be scanned while not scanning the bar code of another medical article at the same time. This also requires the time to scan each article. In the case where the articles are supposed to be in predetermined locations in the container, the inventory tracker must manually refer to another document to determine if the articles in the container are in their proper locations. This bar-coding system is therefore a partial manual system.

Where an automatic system for tracking is desired, RFID is a candidate since identification data is obtained wirelessly and without having to scan article by article. RFID tags have decreased in cost, which has made them even more attractive for such an application.

In an RFID tracking system, a respective RFID tag is typically affixed to each article of inventory. In one embodiment, each RFID tag can broadcast a unique identification number which is the tag's unique serial number and that number can be associated with the identification of the medical article to which it is attached in a database. Thus the tag can be used in tracking articles. In order to read the RFID tags, an antenna is directed at the container. The antenna is interfaced with a reader that transmits interrogation energy via the antenna to the RFID tags, thereby activating the RFID tags which wirelessly respond with their unique serial numbers stored in each tag. The tags' responses are picked up by an RFID receiving antenna and forwarded to the RFID reader. The transmitting and receiving antennas may be the same antenna.

Precautions must be taken with an RFID system to avoid false readings that may be caused by backscatter signals. Simultaneous transmission and reception causes high levels of RF energy to enter the reader, ultimately limiting the reader sensitivity. Existing system designs attempt to solve this problem by either minimizing the signal reflections back into the reader or by using separate transmit and receive antennas. Lessening signal reflections via component selection has practical limitations. Using separate antennas increases the system cost and requires additional space. However, RF absorptive material placed in certain locations about the RFID-tagged medical articles in a container can attenuate RF backscatter and multi-path problems.

Current RFID systems exist that automatically verify the contents of a drawer or tray, or other container. For example, U.S. Pat. No. 8,749,356 to Hussain et al. describes a system where an RFID reader is configured and positioned within a cabinet having drawers with pockets. One or more of the drawers may have an RFID reader system. FIG. 1, which is taken from that patent, presents a perspective view of an RFID tracking system 60 which includes an automated dispensing cabinet 62. The figure shows an open refrigerated drawer 64 in the ADC containing medical articles 66 located in pockets 68 of the drawer. Although the drawing shows reference numeral 68 pointing to only two pockets, it is meant to indicate all pockets. Additional lead lines have been left off to retain clarity in the drawing. The ADC also includes a computer 70 connected to a display device 72 for visually outputting data and processed data, as well as other information as required. The computer includes a processor that is not shown. Two input devices are provided in this embodiment. The first input device is a hardware keyboard 74 and the second is a software or "virtual" keyboard that is formed by the processor and the display device 72 as a touchpad on the face of the display. Data is be output to a server 76 that may or may not be remote from the dispensing cabinet 62 and data is stored to and read from a database 78 that is stored on a non-volatile memory, such as a hard drive formed of a solid-state memory. A communication link 80 exists between the computer 70 and the server 76. The communication link may take various forms, including wireless types and hardwired types. The memory also may or may not be remote in relation to the ADC and the server.

The processor of the computer 70 may store data in the database 78 and may retrieve data from the database as needed. For example, where the medical articles 66 include RFID tags and those tags are activated, the reader in the drawer 64 will read the identification numbers of the activated RFID tags. The computer will receive those RFID tag identification numbers from the reader, communicate with the server 76 to provide the RFID tag identification numbers, and the server will access the database to find the identifications of the medical articles corresponding to the activated RFID tags. The server will then provide those identifications to the computer 70 at the ADC 62. The computer will then display those medication article identifications on the display device 72. Additionally, the server will store in the database the fact that the particular ADC has the medical article to which the activated RFID tag is attached. Communications with the server and the database may occur in real-time or by batch processing.

The drawer 64 has a front panel 82 that moves with the drawer but when the drawer is slid to the closed configuration in the ADC 62, the front panel makes electrical contact with the ADC. If the ADC has surrounded the drawer with electrically-conductive walls ("walls" are meant to include the back, top, bottom, and two side walls), the front panel 80 forms the front wall by being electrically conductive and when closed, coming into electrical contact with the other five walls. In effect, a Faraday cage is formed.

Such a Faraday cage in the ADC is more clearly shown in FIG. 2. The drawer 64 has been completely pulled out of the ADC 62 for clarity of illustration, but in the actual case, the drawer may not be removed as shown except for maintenance purposes. A portion of a Faraday cage 90 is shown and includes five walls. It will be located in the cavity 92 of the ADC. The front end 94 of the Faraday cage is open but when the drawer 64 is slid into the Faraday cage 90 when in the cavity 92, the electrically-conductive front wall 82 of the drawer will come into contact with the Faraday cage 90 thereby forming a complete Faraday cage around the drawer and the medical articles in the pockets of the drawer. The contents of the drawer will then be electrically isolated from surroundings. Electrical isolation is important for the RFID reader in the drawer. When the RFID reader is controlled to inject electrical energy into the drawer to activate RFID tags, that activation energy may travel far enough to activate RFID tags outside the drawer unless the drawer is electrically isolated. Activating RFID tags on medical articles outside the drawer will cause them to transmit their identification numbers and the RFID reader in the drawer will report that these items are in the drawer when in fact they are not. Placing the drawer in a Faraday cage or otherwise isolating the drawer's contents from the surrounding area would overcome this problem.

Also shown in FIG. 2 is an RFID reader module 96 and power 98 for that module. Data to and from the RFID reader module 96 is conducted over the communications line 100 shown. The RFID reader module 96 has necessary probes and antennas 102 and 104 located on a printed circuit board 106 to activate and read RFID tags attached to medical articles that are located in the drawer 64 pockets. The RFID reader module is located within the Faraday cage 90 in the cavity 92. In this embodiment, the RFID reader module will be located above the drawer in the Faraday cage, although other configurations are possible.

The local computer 70 of the ADC 62 in the embodiment of FIG. 2 is programmed to process the RFID data of activated RFID tags on the medical articles that are located in the drawer 64 within the Faraday cage. The local computer 70 in one embodiment is also programmed to create a database of those identified medical articles in the drawer 64 and the RFID data associated with them. The database in this embodiment is stored on a non-volatile memory device located at the local computer 70. In the embodiment of FIG. 1, the database is stored remotely from the local computer and a server is used to access that remote database. In the embodiment of FIG. 2, this remote connection is not shown but in a different embodiment it can exist. In such a different embodiment, two databases exist of the contents of the drawer 64.

Such systems have provided a major benefit to automating the tracking of medical articles. Such systems have improved accuracy, reduced the amount of time needed to conduct an inventory, and provide a cost-effective system for medical inventory control. While such systems can determine that particular medical articles are within a container, the precise location of the medical article within the container to a much higher degree of resolution would be desirable. Such system would be particularly helpful for containers having multiple pockets with predetermined prescribed contents. A system with higher resolution would be able to determine if the prescribed medical articles are in fact stored within the correct pockets.

Covered and open non-metallic trays of various shapes, dimensions, and depths are employed by many industries to store and track articles in predetermined configurations in pockets formed in the tray by non-metallic inserts. The U.S. healthcare industry, for example, stores as few as four and as many as two-hundred and fifty medications in predetermined pockets of non-metallic trays ranging from 1" to 2" deep (2.5 cm to 5.0 cm) and ranging in width/length size from 3"×3" (7.6 cm×7.6 cm) to 18"×16" (45.7 cm×40.6 cm). Verification before deployment, that a specific medication is located in its assigned pocket is critical to the accuracy and efficiency of the processes and operations in which the trays are employed, as the medications need to normally be dispensed and administered quickly. Having to spend time, as in prior systems, looking for and finding a medical article in a drawer or tray having many pockets is time consuming and inefficient.

While RFID systems currently exist to automatically verify that all articles necessary for a complete tray are located in the tray, a need has been recognized for a system that can accurately and automatically verify that each article is in its assigned pocket in the tray. Present verification of the location of each article in a tray is accomplished manually by a human operator, which is time consuming and therefore more expensive, and is prone to errors due to the tedious nature of repeatedly handing articles in small pockets and reading human-readable fine print. Scanning a bar code on a label of a medical article is helpful but still requires manual handling of the medical articles.

In the case where medical article containers exist that have predetermined contents and all contents have predetermined positions in the container, it would be desirable to scan the container with an RFID reader and tracking system to not only verify that the predetermined RFID-tagged articles exist or do not exist in the container, but also to determine more accurately where they are or where they should be in the container. In one case, it would be more efficient for an HCP to access an ADC to determine not only if a medical article is in a particular drawer but to scan that drawer for the RFID tag of that article and determine where exactly in the drawer it is.

Additionally, for those containers that have predetermined positions for medical articles in the container, it would be valuable for those pharmacy personnel who restock ADCs and trays to know exactly where a missing article should be placed. This becomes more important with larger drawers or other containers that have numerous medical articles located within them. While it is a major benefit to be able to determine that something is missing, as is available now, it is an even more important benefit to determine exactly where in the container a replacement article should be placed so that the container is returned to its required configuration. This will result in more efficient operation and more accurate inventories.

Providing an efficient and cost-effective RFID reader system where the reader can determine with precision where in a drawer or tray an RFID tagged medical article resides would enable automated tracking and replenishment of medical articles. Especially in trays or drawers where medical articles must be stored in predetermined pockets, such a system would decrease the amount of time it takes to correctly and accurately restock pockets in a container when medical articles have been removed. However, accurately exciting and reading the RFID tag or tags in just one pocket in a tray having many pockets has proven to be difficult. If the activation energy of the RFID reader strays into adjacent pockets and activates the RFID tagged medical articles in those pockets, the reader may receive the identification signals of the RFID tags from adjacent pockets and report those medical articles as being in the target pocket when in fact they are not there.

Hence, those of skill in the art have recognized a need for an inventory tracking system that automatically verifies whether an RFID-tagged article is located in a selected pocket. Moreover, there is need for an inventory tracking system that provides a cost-effective method of minimizing signal reflections when automatically verifying the specific location of articles in a container. There is a further need for an inventory tracking system that improves efficiency and reduces errors and costs associated with inventory management by automatically verifying the specific location of articles in a container. Such verification may include characteristics about the medical articles, such as expired and recalled status. The present invention fulfills these needs and others.

SUMMARY

Briefly and in general terms, the invention is directed to an inventory tracking system to determine the location of an article labeled with an RFID tag, the article being located in a pocket of a container having a plurality of pockets, each pocket having a size, the system comprising a dual antenna comprising a first antenna having a first forward radiation beam pattern and a second antenna having a second forward radiation beam pattern that has a null area which is less than the size of a pocket, a movable antenna mount on which is mounted the dual antenna in a configuration in which the first forward radiation beam pattern of the first antenna overlaps the null area of the second forward radiation beam pattern of the second antenna, and wherein the antenna mount is controllably movable to radiate into a plurality of the pockets of the container, a controller programmed to activate the first antenna to transmit the first forward radiation beam pattern to a selected pocket and thereafter to read a first set of read data from any responding article labeled with an RFID tag, the controller also programmed to alternately activate the second antenna at the same pocket to transmit the second forward radiation beam pattern and thereafter to read a second set of read data from any responding article labeled with an RFID tag, an RFID reader connected to the dual antenna to receive the first set of read data from articles responding to the first antenna, receive the second set of read data from articles responding to the second antenna, and output the two sets of read data, and a processor that is programmed to receive the two sets of read data from the RFID reader, compare the first set of read data regarding RFID tags responding to the first antenna with the second set of read data regarding RFID tags responding to the second antenna, and based on the comparison, determine that the location of an RFID tag that responded to the first antenna but did not respond to the second antenna is in a particular pocket.

In more detailed aspects, the system further comprises a motor connected with the movable antenna mount to position the movable antenna mount in relation to a selected pocket in response to position control signals, and wherein the processor is further programmed to provide position control signals to the motor to position the mount in relation to the selected pocket. Further comprising a display device responsive to display signals to visually present information, a memory in which is stored a position database of positions of each of the pockets of the container and an inventory database of the articles that are expected to be in each of the pockets, wherein the processor is further programmed to read the position database in the memory to determine the positions of each pocket and thereafter to provide position control signals to the motor to position the mount in relation to all pockets of the container and determine the actual contents of each pocket, wherein the processor is further programmed to read the inventory database in the memory to determine the expected contents in each pocket and thereafter to compare the actual contents of each pocket to the expected contents of each pocket to determine if articles should be added to or removed from each pocket, and wherein the processor is further programmed to provide display signals to the display device to control the display device to visually present information describing the articles that should be added to or removed from each pocket.

In yet additional aspects, the inventory tracking system further includes a plurality of dual antennas mounted on the movable antenna mount, each dual antenna having a known spatial distance from each other dual antenna, the known spatial distance between the dual antennas being selected to be consistent with spacing between the pockets. An RSSI module receives RSSI data from the dual antenna and outputs the RSSI data to the processor. The first antenna and second antenna are co-located on the antenna mount in a configuration in which their center lines coincide. The processor is further programmed to provide position control signals in response to which the antenna mount moves among the pockets in a stepping grid pattern and stops at read points to read an article located in a pocket.

Additional aspects include the null area is about one-fourth to one-eighth the size of a pocket, and wherein the processor is further programmed to provide position control signals in response to which the movable antenna mount stops to direct the null area at multiple read points for each pocket to read the pocket. The processor is further programmed to provide position control signals in response to which the movable antenna mount moves among the pockets in a stepping grid pattern to read the articles while in motion without stopping at read points.

In accordance with method aspects, there is provided a method for determining the location of an article labeled with an RFID tag, the article being located in a pocket of a container having a plurality of pockets, each pocket having a size, the method comprising transmitting a first forward radiation beam pattern from a first antenna toward a selected pocket of the container and thereafter reading a first set of read data from any article labeled with an RFID tag, alternately transmitting a second forward radiation beam pattern from a second antenna toward the selected pocket of the container, the second forward radiation beam pattern having a null area directed at the selected pocket, the null area being less than the size of the selected pocket at which the null area is directed, and thereafter reading a second set of read data from any article labeled with an RFID tag, receiving the first set of read data from articles responding to the first antenna, receiving the second set of read data from articles responding to the second antenna, sending the two sets of read data to a processor, comparing the two sets of read data, and determining that an article identified to the first antenna but not identified to the second antenna resides in the selected pocket, and moving the first and second antennas among the pockets of the container.

Another method aspect includes receiving RSSI data into an RSSI module from the first antenna and the second antenna and outputting the RSSI data to the processor to determine the location of a responding RFID tag.

In further system aspects, there is provided an inventory tracking system to determine the location of an article labeled with an RFID tag, the article being located in a pocket of a container having a plurality of pockets, the system comprising an antenna gateway device having openings, the antenna gateway device positioned so that the openings are aligned with respective pockets, the antenna gateway device having a side facing the pockets of the container and a side facing away from the pockets of the container, wherein a size of each of the openings is selected to allow radiation of a selected frequency range through the opening, an antenna having a forward radiation beam pattern, the pattern being wide enough to radiate through all of the openings of the antenna gateway device, the antenna being located on the side facing away from the pockets of the container of the antenna gateway device, the antenna facing the antenna gateway device whereby the antenna gateway device provides control over the forward radiation beam pattern of the antenna to separate the beam pattern into separate beams that radiate through the openings of the antenna gateway device, an antenna gateway controller that switches each opening between an operable state and an inoperable state such that when in the operable state, the radiation beam of the antenna at the selected frequency is allowed to radiate through the opening, and when in the inoperable state, the radiation beam of the antenna at the selected frequency is not allowed to radiate through the opening, the antenna gateway controller being responsive to gateway switch control signals to switch each opening between the operable and inoperable states, a processor that is programmed to provide gateway switch control signals to the antenna gateway controller to switch the openings between the operable and inoperable states in response to programming under which some or all of the pockets are to be read, the processor also programmed to activate the antenna to transmit the forward radiation beam pattern through an opening of operable state into a particular pocket and thereafter to read a set of read data from any responding article labeled with an RFID tag, and an RFID reader connected to the antenna to receive the set of read data from articles responding to the antenna and to output the set of read data to the processor which determines that articles responding to the antenna are located in the particular pocket.

More detailed aspects include an RSSI module that receives RSSI data from the antenna and outputs the RSSI data to the processor. The antenna gateway controller comprises a switch located at each opening that is controlled to switch between an open state and a closed state by the gateway switch control signals, wherein the open state switches the opening to the operable state, and wherein the closed state switches the opening to the inoperable state. The switch comprises a semiconductor device positioned across the opening, the state of which is controlled by the gateway switch control signals. The openings comprise slots, wherein a size of each of the slots is selected to allow radiation of a selected frequency range through the slots. Multiple slots are aligned with respect to each individual pocket.

Other aspects include a display device responsive to display signals to visually present information, a memory in which is stored a position database of positions of each of the pockets of the container and an inventory database of the articles that are expected to be in each of the pockets, wherein the processor is further programmed to read the position database in the memory to determine the positions of each pocket and determine the actual contents of each pocket, wherein the processor is further programmed to read the inventory database in the memory to determine the expected contents in each pocket and thereafter to compare the actual contents of each pocket to the expected contents of each pocket to determine if articles should be added to or removed from each pocket, and wherein the processor is further programmed to provide display signals to the display device to control the display device to visually present information describing the articles that should be added to or removed from each pocket.

Yet other method aspects include a method for determining the location of an article labeled with an RFID tag, the article being located in a pocket of a container having a plurality of pockets, each pocket having a size, the method comprising transmitting a forward radiation beam pattern from an antenna toward an antenna gateway device positioned between the antenna and the pockets of the container, the antenna gateway device having openings aligned with respective pockets, wherein the size of each of the openings is selected to allow radiation of a selected frequency range through the opening, and wherein the openings are controlled by an antenna gateway controller to switch between an operable state and an inoperable state such that when in the operable state, the radiation beam of the antenna at the selected frequency is allowed to radiate through the opening, and when in the inoperable state, the radiation beam of the antenna at the selected frequency is not allowed to radiate through the opening, sending a first gateway control signal to the antenna gateway controller to switch the opening aligned with a selected pocket of the container into an operable state such that the forward radiation beam pattern of the antenna is allowed to radiate through the opening and read a set of read data from any article labeled with an RFID tag, alternately sending a second gateway control signal to the antenna gateway controller to switch the remaining openings aligned with the remaining pockets of the container into an inoperable state such that the forward radiation beam pattern of the antenna is not allowed to radiate through the remaining openings, and receiving the set of read data from articles responding to the antenna, sending the set of read data to a processor, and determining that an article identified by the antenna resides in the selected pocket. Further, the method comprises receiving RSSI data into an RSSI module from the antenna and outputting the RSSI data to the processor.

BRIEF DESCRIPTION OF THE DRAWINGS

FIG. 2 also shows an RFID tracking system that is placed within the metallic cage to track the medical articles in the pockets of the drawer;

FIG. 29 is a top view of a configuration of slots in RF energy guide material which in this case is a metal sheet/layer of FIG. 28 through which the transmission of RFID energy is controlled;

FIG. 30 is a top schematic view of an example of a slot in one of the metal squares shown in FIG. 29 with diode control over energy conduction through the slot;

FIG. 31 is an enlargement of the diode and slot configuration of FIG. 30, the diode controlling whether the slot is open so that RF energy may pass, or is closed so that no RF energy passes;

FIG. 32 illustrates a front block view of part of the container of FIG. 3 showing pocket partitions, the metal layer having slots (transmission path gateways), and an RFID reader and antenna shown in block form, wherein the antenna's energy pattern encompasses all slots and RF energy control is obtained through slot-by-slot control as shown in FIGS. 30 and 31;

FIG. 33 shows a front block view of a PCB gateway in which energy control such as that shown in FIG. 30 is used to permit the passage of energy through the slot on the left into the respective pocket above the open slot and closing the slot to the right to inhibit the passage of energy into the pocket above the closed slot resulting in one active slot and one inactive slot;

FIG. 34 shows transmission slots formed in metal radiation control plates for controlling the beams of an antenna or antennas. In this embodiment, the radiation control plates are surrounded by ground feed-through arrays;

FIG. 35 shows a side block diagram view of a radiation control plate having ground pads on either side of the plate with "feed-throughs" interconnecting the pads, and a transmission path gateway control;

DETAILED DESCRIPTION

Figure 1:
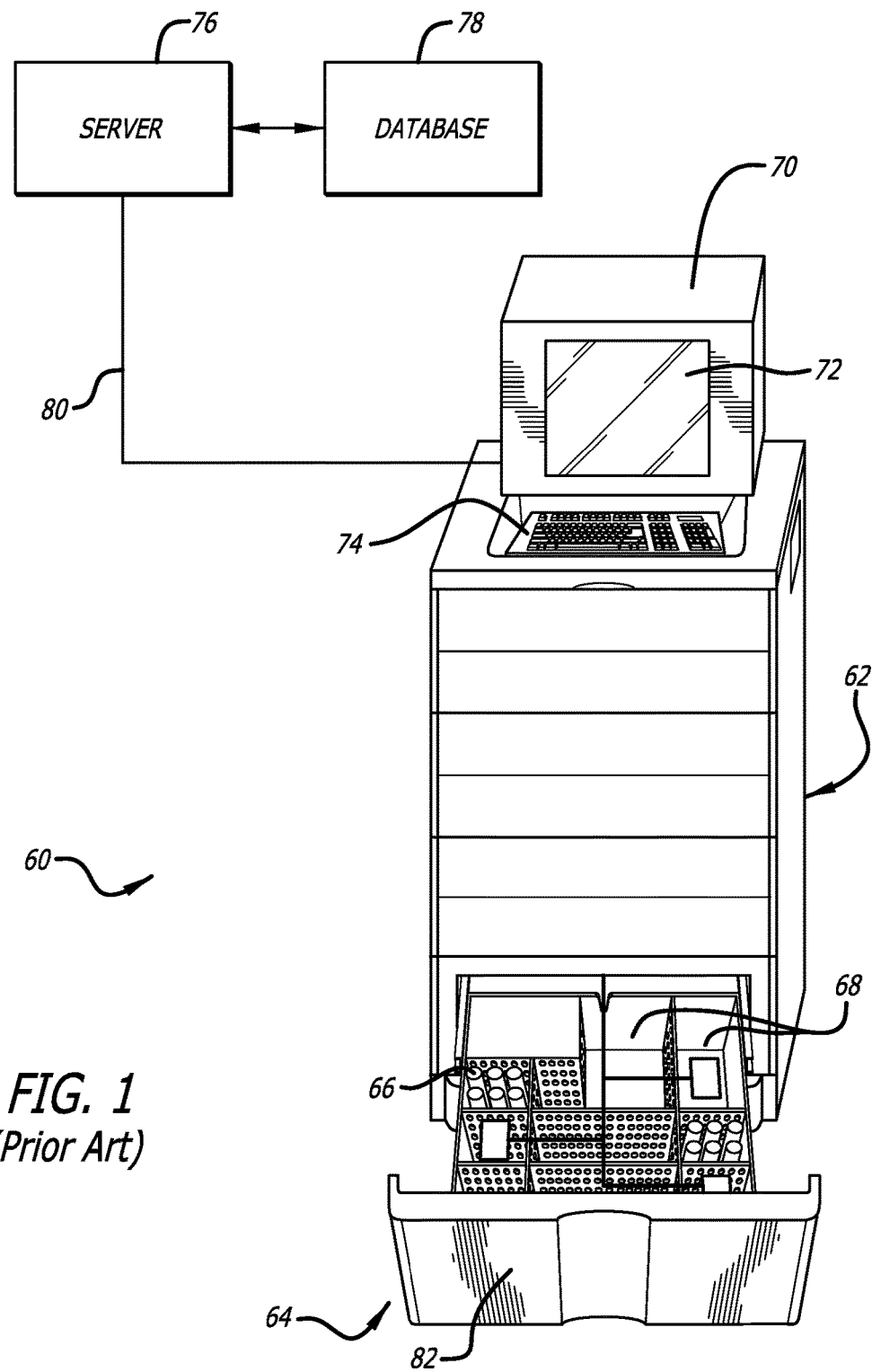
FIG. 1 is a perspective and schematic view of a prior art medical inventory tracking system disclosed in U.S. Pat. No. 8,749,356 having an automated dispensing cabinet ("ADC") with multiple drawers that have pockets. The ADC also has a local computer with a processor and input and output devices for operator control, and also has a connection to a server having a database, both or either of which may be remote to the ADC.
Figure 2:
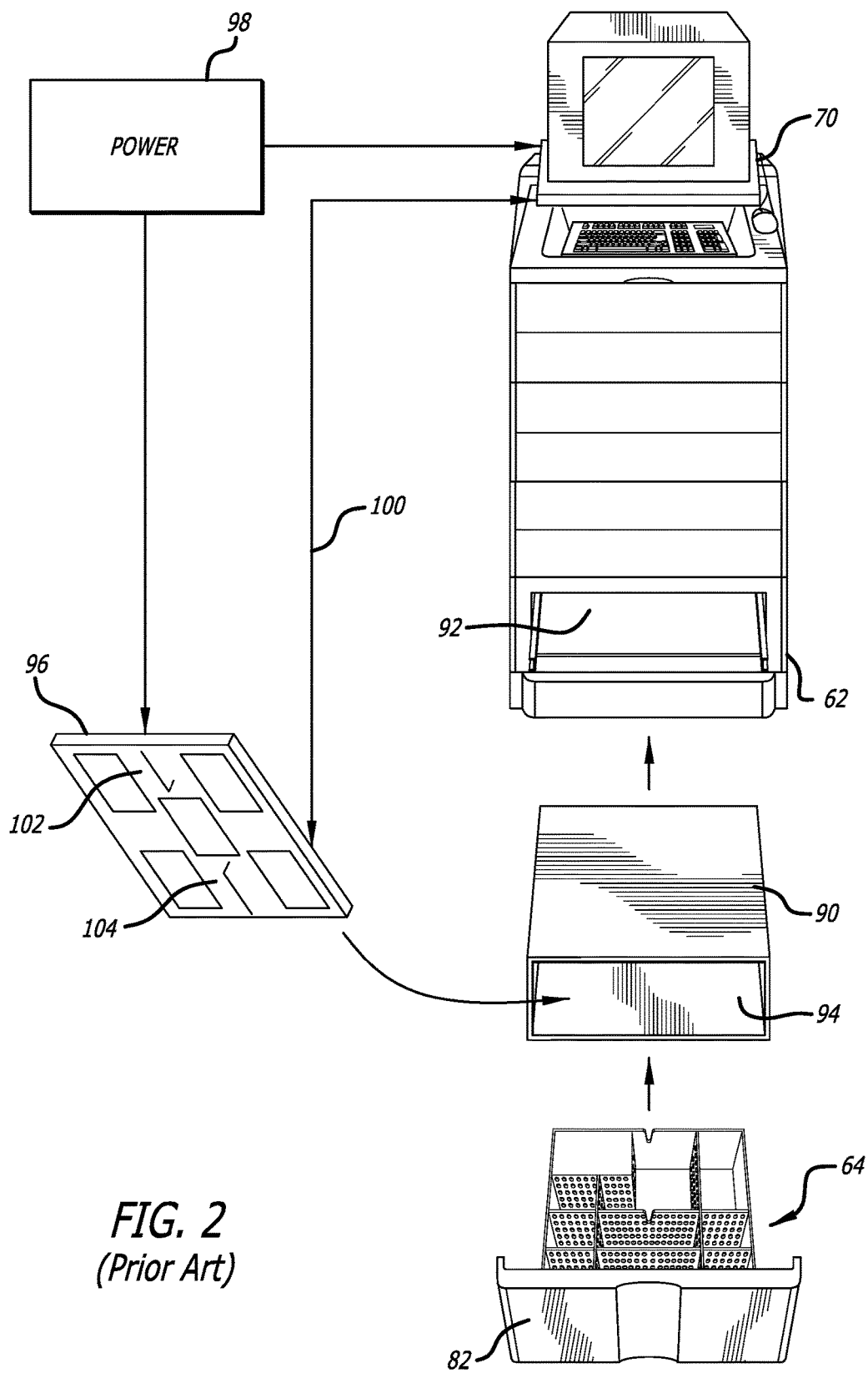
FIG. 2 is a drawing from U.S. Pat. No. 9,268,978 and is very similar to FIG. 1 but shows a perspective, schematic, and exploded view of the inventory tracking system of FIG. 1 in which the bottom drawer likewise has multiple pockets. The bottom drawer has been pulled outwardly from a cavity in the ADC in which it is mounted, and shows a metallic cage also pulled outwardly from the same cavity into which the drawer slides, the metallic cage being used to establish a Faraday cage isolation for the drawer when it is pushed into the ADC in the closed configuration.

Detailed embodiments of the present invention are disclosed herein; however, it is to be understood that the disclosed embodiments are merely exemplary of the invention and that the invention may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

While exemplary embodiments are described above, it is not intended that these embodiments describe all possible forms of the invention. Rather, the words used in the specification are words of description rather than limitation, and it is understood that various changes may be made without departing from the spirit and scope of the invention.

Additionally, the features of various implementing embodiments may be combined to form further embodiments of the invention.

The invention is directed to a system and method for automatically identifying medical articles labeled with RFID tags that are located in the pockets of a container on a pocket-by-pocket basis. Further, the system and method according to the invention is for automatically verifying that medical articles labeled with RFID tags are distributed in the pockets of a container, such as a tray, according to a predetermined configuration for that container. As a clarification, RFID tags are generally mounted or embedded in a container of a medication. For example, in the case of a tablet of aspirin, the RFID tag would be attached to the bottle of aspirin, or foil wrapping of the aspirin, not to the aspirin tablet itself. However for convenience, the term "medical article" is used herein and is meant to include both the containers of medications and medications themselves.

In one embodiment of the invention, an RFID reader system located inside an RF-shielded enclosure, for example: 26" wide×19" deep×13.5" high (66 cm×48.3 cm×34.3 cm), has a door and internal platform large enough to accommodate a large tray (such as 18"×16"×3" (45.7 cm.×40.6 cm×7.6 cm)) containing medical articles in pockets. In one embodiment of the invention, the RFID reader system is located under or above the tray and is composed of a printed circuit board ("PCB") of a length longer than the depth of the deepest tray to be verified, the PCB is patterned with multiple antenna elements, the antenna elements are connected to a system of RF multiplexers that in turn are connected to the RF output of an RFID reader. The RFID reader can be mounted in the enclosure and connected to the antenna PCB via coaxial cables or can be mounted on the PCB containing the antenna patterns, the RF outputs of which are connected to the antenna via the RF multiplexers.

The rectangular antenna PCB is positioned front to back under a non-metallic platform in the RF enclosure and parallel to the short side of the rectangular tray containing tagged articles which is positioned on top of the platform. There exists a mechanical means for moving the rectangular antenna PCB left to right under the platform across the entire width of the tray with tagged articles on the platform above.

In one embodiment, the antennas on the PCB consist of individual elements, each capable of transmitting an RF signal, or may instead comprise elements capable of being combined together to form one antenna array capable of transmitting an RF signal. The antennas patterned on the narrow rectangular PCB would be spaced on a maximum pitch matching the most dense pocket pitch of trays designed to store tagged articles. The antennas patterned on the narrow rectangular PCB are spaced on a pitch that results in more than one antenna positioned in the same area as one pocket of the most dense pocket pitch of trays designed to store tagged articles. Antennas are patterned in one or more rows on the narrow rectangular PCB, providing multiple positions from which to transmit RF signals from the RFID reader and receive RF signals from the RFID tag. Although described as "transmitting," the antennas may also function to receive signals. For example, the same antenna may function to inject RFID activation RF energy into a pocket to activate any RFID tags in the pocket, as well as receive the RF identification signals transmitted by activated RFID tags in that pocket.

In a second embodiment of the invention, the RFID reader system located under or above the tray is composed of a PCB approximately square in shape. The PCB is patterned with multiple antenna elements with the antenna elements being connected to a system of RF multiplexers that in turn are connected to the RF output of an RFID reader. The RFID reader is mounted in the enclosure and connected to the antenna PCB via coaxial cables or can be mounted on the PCB containing the antenna patterns, the RF outputs of which are connected to the antenna via the RF multiplexers.

The antennas on the PCB consist of individual elements, each capable of transmitting an RF signal. In an alternative, elements capable of being combined together to form one antenna array capable of transmitting an RF signal are used. The antennas patterned on the square PCB are spaced on a maximum pitch matching the most dense pocket pitch of trays designed to store tagged articles. The antennas patterned on the square PCB are spaced on a pitch that results in more than one antenna positioned in the same area as one pocket of the most dense pocket pitch of trays designed to store tagged articles. One main antenna is patterned in the center of eight other antennas forming a 3×3 pattern of transmit and/or receive antennas, providing multiple positions from which to transmit RF activation energy from the RFID reader and to receive RF identification signals from the activated RFID tags.

In either embodiment the tray used for storing medical articles is a standard uncovered non-metallic tray with non-metallic dividers forming the medical article storage pockets. In another embodiment, an uncovered tray having metallic or shielding (metal screen of a pitch that resembles a solid reflective wall to 915 MHz RF energy) side walls and divider material with a non-metallic bottom surface is used. Yet another tray version would include one of the above versions with a metallic or shielding cover. These are described in more detail below and are shown in various figures.

The process of verifying that a specific medical article is located in its assigned tray pocket is based on identifying the RFID tags attached to each medical article container. The tags are identified by the antennas patterned on the antenna PCBs described above. The antennas can be used to identify RFID tags using two methods. The first method is to use each antenna as both the source of transmitted RF activation energy and also the receiving element for the return identification signal from the RFID tag. The second method is to use one antenna as the source of the transmitted RF activation energy and a separate antenna as the receiving element of the RFID tag identification return signal.

In the rectangular PCB antenna embodiment described above, the verification process depends on an X-axis positioning system that moves the antenna PC board left to right under or over each column of tray pockets. The X-axis positioning system pauses briefly (two seconds) under or over each column of pockets and executes multiple tag read commands from several antennas performing both transmit and receive functions as well as from several combinations of antennas performing separate transmit and receive functions. Movements are described above as under or over because, as stated previously, embodiments herein may have antenna arrays mounted over the pockets of a tray or under the pockets of a tray, depending on the configuration of the reader system. In a different embodiment, it is possible that some components of the same reader system may be over the container pockets and some components may be under the pockets.

In the square PCB antenna embodiment described above, the verification process depends on an X-Y positioning system that moves the antenna PC board under or over each pocket in the tray. The X-Y positioning system pauses briefly (0.25 seconds) under or over each pocket and executes multiple tag read commands from several antennas performing both transmit and receive functions as well as from several combinations of antennas performing separate transmit and receive functions.

Each time the RFID reader executes a "read tag" command, any tag in the RF field of the transmit antenna will receive activation energy and will attempt to respond. If the tag responds successfully, the reader will collect the identification signal of the activated RFID tag comprising a unique ninety-six bit unique ID of the tag and the return signal strength indicator ("RSSI") in decibels of the return signal from the tag. The value of return signal strength from the RFID tag to the RFID reader is generally proportional to the distance between the tag and the antenna receiving the return signal.

The process of verifying that specific medical articles are located in their assigned pockets requires the collection of unique tag IDs and their associated RSSI value, under each column of pockets or under each individual pocket of a tray used to store medical articles. The data collected from a series of RFID tag read cycles is stored in a matrix and then analyzed in order to assign a value to each RFID tag ID (i.e. medical article) which represents the probability that the medical article is located in its assigned pocket. The iterative testing described above could include collecting data using different reader configurations including the variation of RFID reader RF power, frequency, sensitivity, air protocol parameters, and other configurable reader settings. The algorithm used to determine the location of each medication is based on the analysis of results from iterative testing of known medical article tray configurations. As used herein, air protocol parameters comprise parameters well known to those skilled in the art. For example, the pulse width may be altered.

In another embodiment of the invention, the enclosure would include RF absorbent material inside the RF enclosure to reduce multipath reflections of RF energy that can result in tags being identified by an antenna in a location far removed from the pocket in which it resides.

In another embodiment of the invention, the enclosure material is non-metallic and includes RF absorbent material inside the enclosure to reduce the multipath reflections of RF energy that can result in tags being identified by an antenna in a location far removed from the pocket in which it resides.

In another embodiment of the invention, the enclosure is eliminated altogether to reduce the multipath reflections of RF energy that can result in tags being identified by an antenna in a location far removed from the pocket in which it resides.

In another embodiment of the invention, a dual antenna system is moved beneath the non-metallic tray, containing RFID-tagged medical articles, in an X-Y pattern that covers the entire area of the tray. The exact X-Y stepping pattern of the antenna is dependent on the pocket size and the size of the medical articles in the pockets. The dual antenna is designed such that one antenna has a read field approximately the size of a tray pocket while the second antenna, centered on the first antenna, includes a null power area in the RF field directly above the antenna. For purposes of description herein, a null is an area in the RF field where insufficient energy exists to power a passive RFID tag. The RFID reader attempts to identify RFID tags alternatively between the two antennas as the dual antenna structure is moved in the X-Y grid underneath the tray with RFID-tagged articles. The position of a tagged article is determined when the first antenna identifies the RFID tag while immediately thereafter, the second antenna is unable to identify the same RFID tag.

Each container/reader/antenna board combination fabricated for use with this embodiment is calibrated using "golden" tray configurations and "golden" RFID tags. As is well known to those of skill in the art, a "golden" device is an ideal example of a device against which all later devices are tested and judged. The data collected from golden trays is analyzed and compared to validation systems and if necessary, adjustments in the form of offsets are used to customize the analysis algorithm for the system. In addition, each new user tray configuration is tested multiple times and the data is used to further calibrate the algorithm for each enclosure/reader/antenna board combination.

In another embodiment, beam sweeping antennas operating at extremely low power can be added to confirm the probability of tagged medication being misplaced or being located in the assigned tray pocket.

Figure 3:
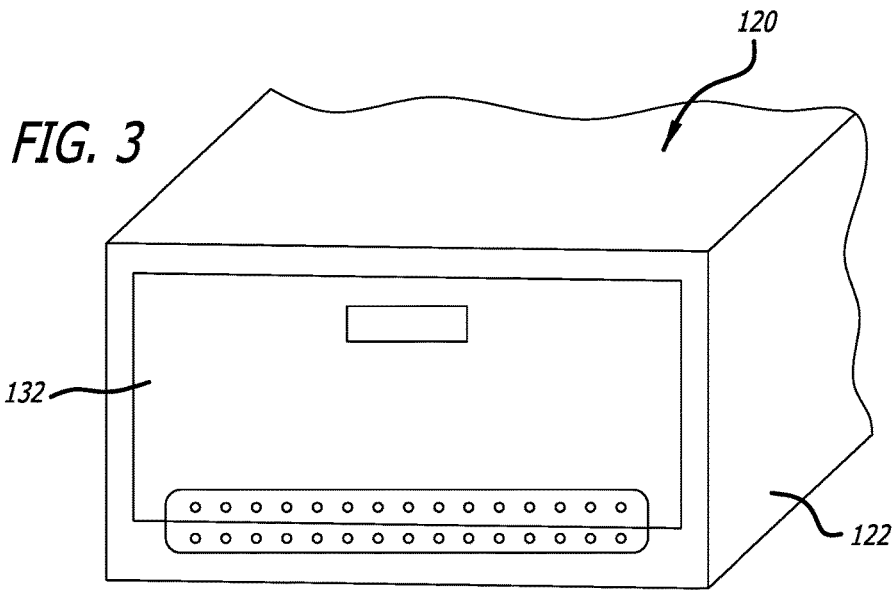
FIG. 3 is a partial front perspective view of a container in which an RFID tracking system is installed, the container have a front hinged door shown in a closed position (configuration), the door having a handle for manipulating the door between open and closed configurations, and showing an exaggerated hinge for the front door. In this case, the outer material of the container, including the front door which is in electrical contact with the outer material, establishes a Faraday cage about the interior of the container for electromagnetic ("EM") energy isolation. Additionally the container is large enough to receive trays of medical articles and take an inventory of that tray.
Figure 4:
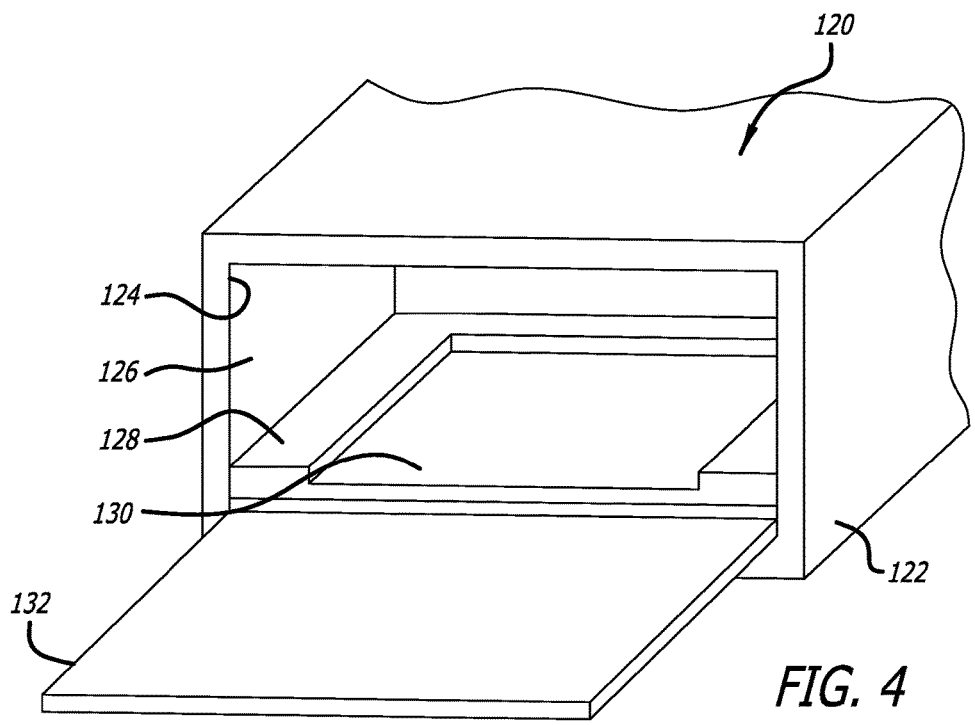
FIG. 4 is a perspective view of the container of FIG. 3 showing the front access door in the open configuration, and showing an example of the interior of the container. In this case, the interior includes a recess in which a tray of medical articles may be placed for RFID scanning for the purpose of tracking articles in the tray. The interior of the container has a false bottom under which RFID reader apparatus is located, and the recess of the container above the false bottom has an indentation that is large enough to receive a tray of a predetermined size and accurately position that tray over the RFID reader devices in the false bottom for accurately sensing and locating medical articles in a tray being inventoried.

Referring now to FIGS. 3 and 4, the system of this embodiment is based on an RFID tracking system enclosure 120 which resembles a Faraday cage (i.e. the enclosure is electrically conductive material designed to contain all RF energy in the enclosure). In FIGS. 3 and 4, the enclosure 120 includes an outer shell 122 of electrically conductive material, an opening 124 through which a medical article container may be placed into, or removed from, an interior space 126. This interior space is where a container, such as a tray, of medical articles, may be placed to be inventoried, as is described below in further detail. In FIG. 4, a recess form has been made in the interior shelf 128 that positions a container is a preferred position within the enclosure when the RFID reader system is active. Such a position may be preferred because sufficient RFID activation energy is received in all areas of the recess. The enclosure 120 also includes a door 132 that is movable between a closed configuration at which the opening 124 of the enclosure is covered as shown in FIG. 3 or is uncovered as shown in FIG. 4.

Figure 5:
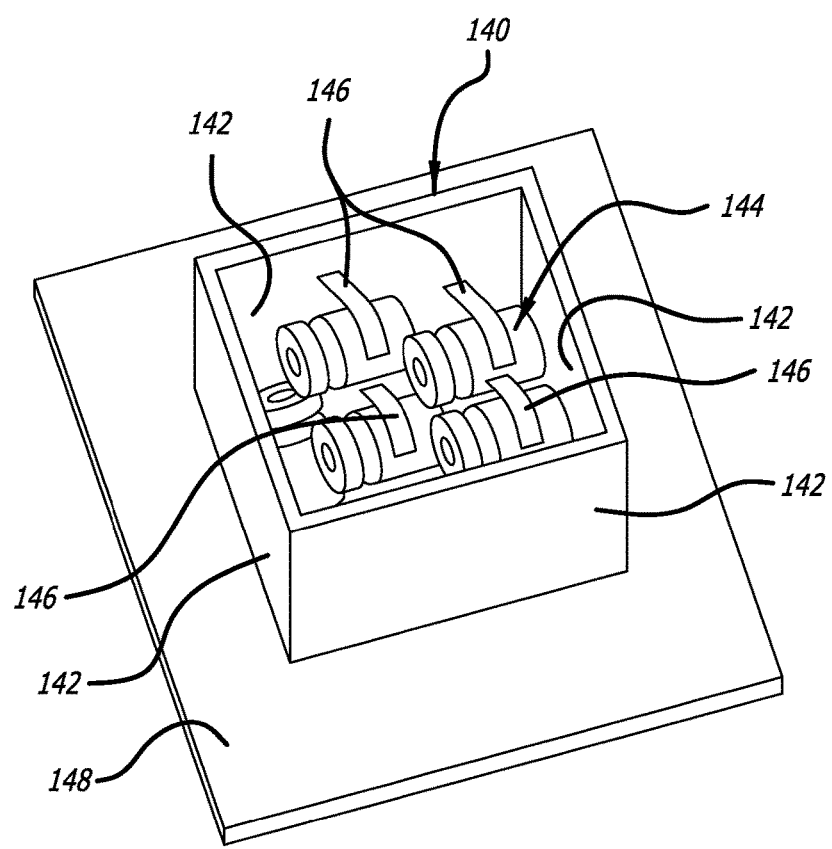
FIG. 5 shows a perspective view of an example of a single pocket with metallic walls having RFID tagged medicine vials (medical articles) located in random positions in the metallic pocket. For the purpose of illustration of this figure, the top of the pocket is open.

FIG. 5 illustrates an embodiment of a single pocket 140 with metallized walls 142. Medical articles 144 are shown as being stored in the pocket. It will be noted that each medical article includes a respective RFID tag 146. The enclosure contains a single partition having RFID-tagged medical articles, in this case medicine vials, placed in random positions inside the pocket. The medicine vials are placed on a false bottom 148 inside the pocket, and the RFID reader and associated antenna system (not shown) reside underneath the false bottom.

Figure 6:
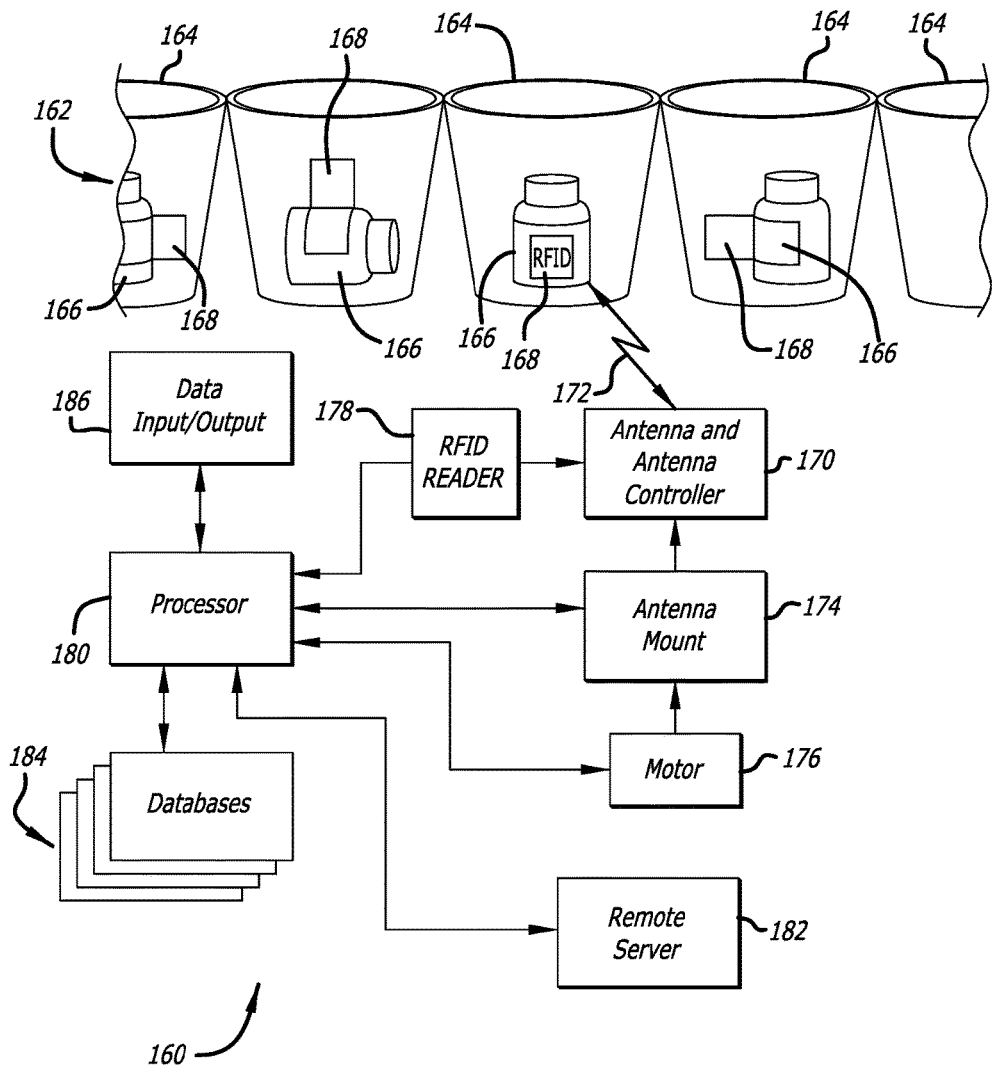
FIG. 6 shows a block diagram of an RFID tracking system embodiment according to aspects of the invention showing a plurality of pockets of a container tray in which medical articles are located, the tracking system having an antenna or antenna array with a movable antenna mount and a motor to move the antenna mount and therefore the antenna, the motor controlled by a processor.

FIG. 6 illustrates a schematic of the RFID system 160 according to an embodiment of the invention. A container 162 contains a plurality of pockets 164 inside which is placed RFID-tagged 168 articles 166. An antenna controller 170 controls an antenna device 170 to transmit a forward radiation beam pattern 172 to a selected pocket 164 and read the tags 168 of the articles in the selected pocket. The antenna device can be mounted on a movable antenna mount 174 which is connected to a motor 176. The motor positions the antenna mount in relation to the selected pocket in response to position control signals sent by the antenna controller. The read identification data of the RFID tags is received into an RFID reader 178, which in turn converts and transmits the read data to a processor 180. The processor interfaces with a remote server 182, databases 184, and data input/output 186 to read, store, manage, or display the read data for the tagged articles. The processor uses the read data to determine that the articles identified by the antenna device reside in the selected pocket.

Figure 7:
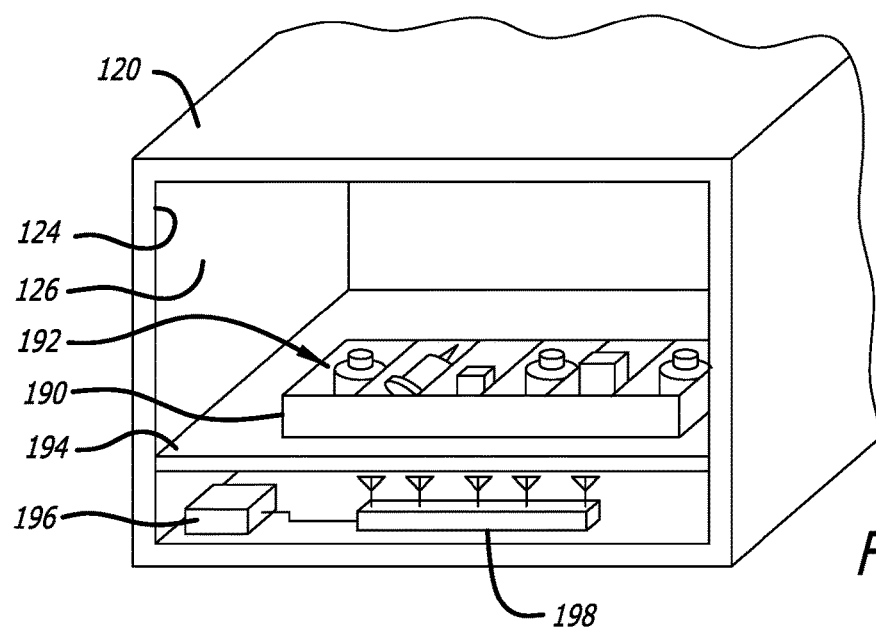
FIG. 7 is a front perspective view of part of the enclosure of FIG. 3 with the front door removed, showing a tray disposed therein having medical articles located in pockets, the tray being located on a false bottom of the container with an antenna array below both the tray and the false bottom for activating and reading RFID tags attached to the medical articles, and also located below the false bottom is an RFID reader connected with the antennas for injecting RFID activation energy into the container through the antennas and for receiving through the antenna array the identification signals transmitted by the activated RFID tags attached to the medical articles.
Figure 8:
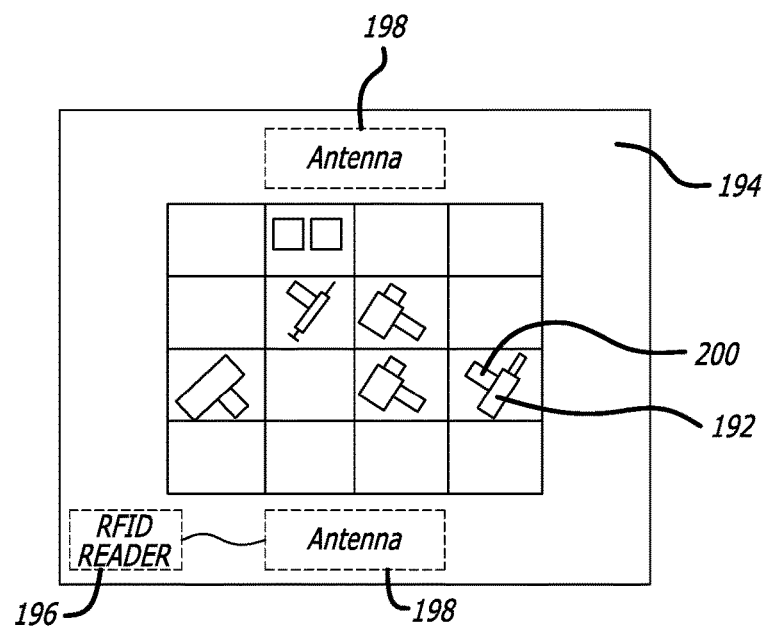
FIG. 8 is a top view of the tray of FIG. 7 in the container of FIG. 7 showing medical articles in pockets of the tray with the top of the container removed to show the RFID reader and antennas in dashed lines indicating that they are located below the false bottom.

FIGS. 7 and 8 illustrate another embodiment of the enclosure 120 of FIG. 3. The tray of medical articles 190 with RFID-tagged articles 192 (RFID tags shown in FIG. 8) is placed on a non-metallic false bottom surface 194 of the enclosure. An RFID reader 196 and associated antenna system 198 reside under the false bottom. The accuracy and repeatability of the RFID tag identification process is directly associated with the fact of RF energy "filling" the metal enclosure by reflecting off all metal surfaces.

Figure 9:
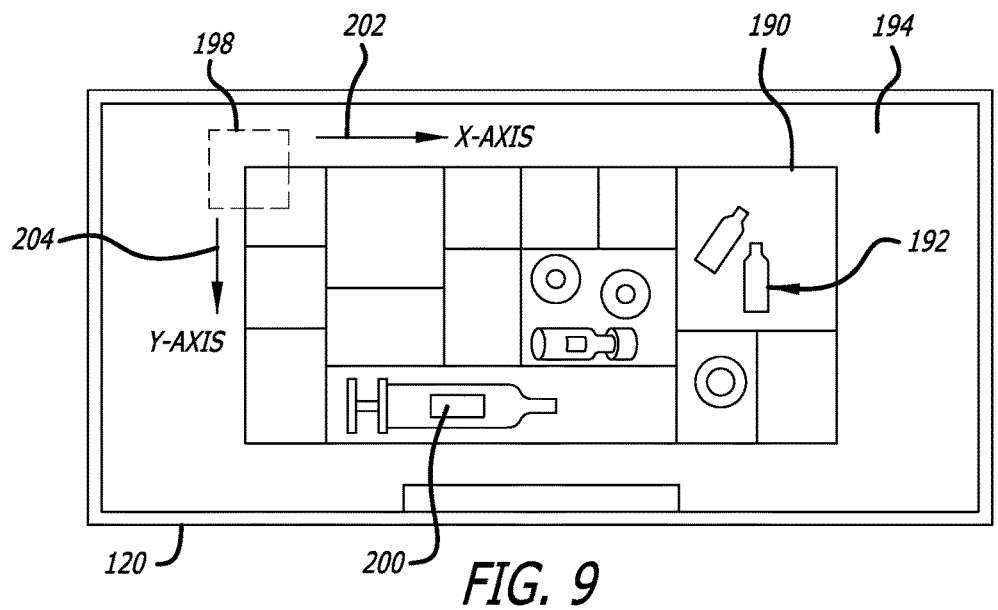
FIG. 9 is also a top view of a different tray of medical items located in pockets of the tray, each medical article having an RFID tag attached to it for identification purposes, and also showing part of the container of FIG. 7 showing is dashed lines a positioning system of the antenna array of FIG. 7 in block diagram form and the axes of movement of the antennas underneath the false bottom and underneath the tray to activate and read RFID tags mounted to medical articles in tray pockets.

In one embodiment of the invention shown in FIG. 9, an antenna 198 is moved by an X-Y positioning system beneath the false non-metallic bottom. (X-Axis is 202 and Y-Axis is 204). The RFID read antenna can be operating while moving or can be stopped to read tags 200. The stepping pattern (distance between the rows and columns) of the read field could be variable and depend on the size of the tray, the quantity of medical articles 192 in the tray 190, the sensitivity of the tags, and other factors. At each of the read points in the X-Y stepping grid the RFID reader 196 (FIG. 7) will store the ID of the tags read at that grid point, along with the RSSI and number of times the tag was read. The conducted RF power delivered from the RFID reader to the RFID read antenna can be varied in order to collect additional data that will contribute to the determination of the pocket location.

Figure 10:
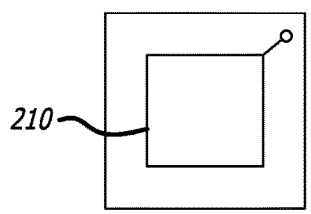
FIG. 10 is a top view of an embodiment of a printed circuit board ("PCB") with a single RFID read antenna mounted thereon.

FIGS. 10-14 show that, in the embodiment where an RFID read antenna is moved in an X-Y grid under the tray containing the tagged medication, the read antenna can take many forms. FIG. 10 shows an embodiment of the antenna 210 where the dimensions are roughly the size of the smallest tray pocket and the antenna performs both the transmit and the receive functions when communicating with the RFID tag.

Figure 11:
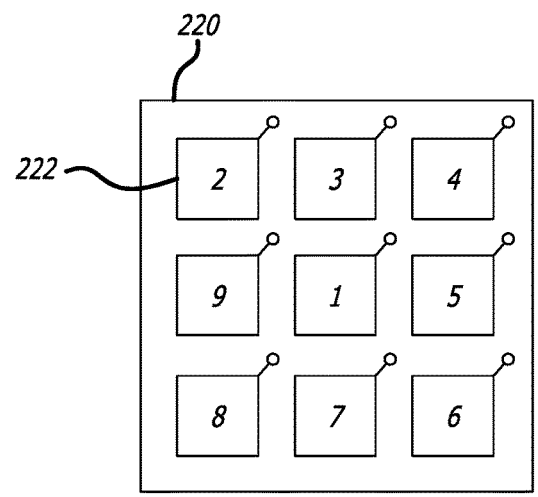
FIG. 11 is a top view of a PCB with an array of RFID read antennas formed thereon.
Figure 12A:
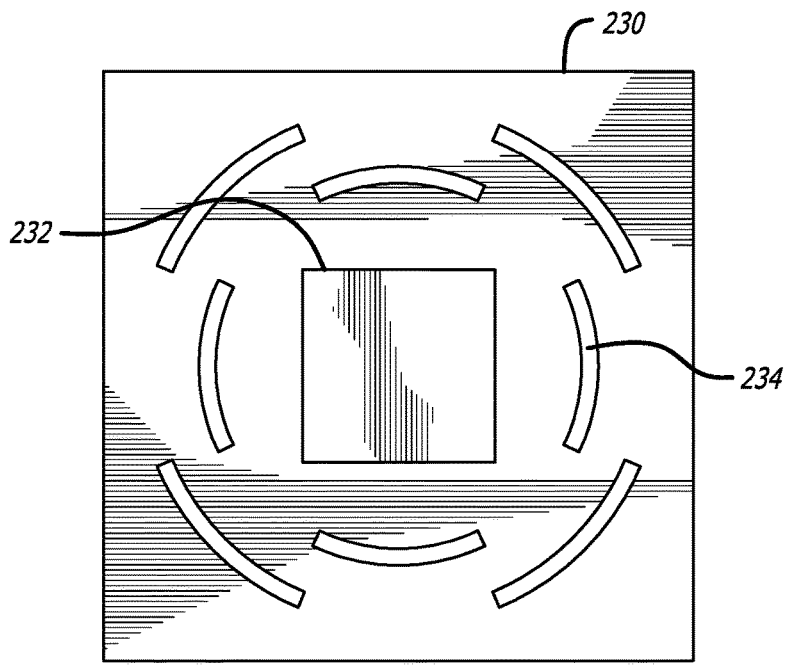
FIG. 12A is a top view of a dual antenna device Type C embodiment having a centrally-mounted antenna A co-located, and in this embodiment, coaxial with an antenna B that surrounds antenna A to provide two different beams of radio frequency ("RF") energy.
Figure 12B:
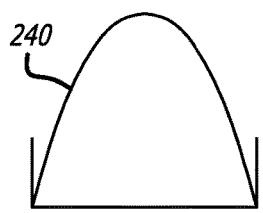
FIG. 12B is an antenna field energy pattern for antenna A of FIG. 12A.
Figure 12C:
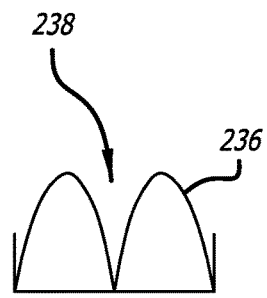
FIG. 12C is an antenna field energy pattern for antenna B of FIG. 12A showing a centralized null field in the energy pattern.
Figure 13:
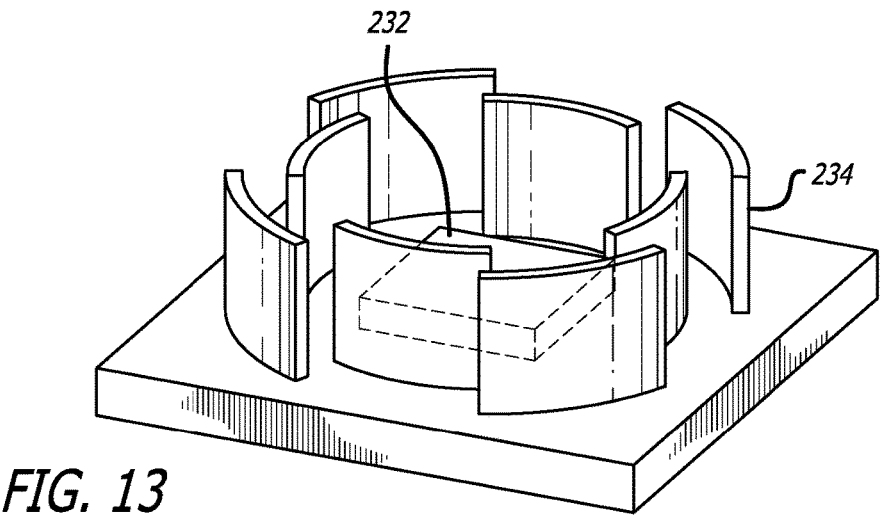
FIG. 13 is a perspective view of the dual antenna of FIG. 12.

FIG. 11 depicts an embodiment of an array 220 of nine antennas, one of which is indicated by reference numeral 222, which provides flexibility to the transmit and the receive functions when communicating with the tag. The dimensions can vary from roughly the size of the smallest pocket to four times the size of the smallest tray pocket. The antennas 222 in FIG. 11 can be configured electrically (automatically, in situ, or on the fly), using RF switches and logic in the software application, to transmit on one antenna while receiving on a different antenna. For example, each time the antenna comes to rest at a reading point on the X-Y grid under the medication tray, antennas 2 through 9 can transmit in turn, while antenna 1 receives the RF return signal from the passive UHF RFID tag. By using different antenna pairs for the transmit/receive functions, the useful tag ID, the RSSI, and the number of times a tag is read, data can be collected for use in determining the pocket location of tagged medication.

The dual antenna 230 shown in FIGS. 12A, 12B, 12C, 13, and 14 is another embodiment of an antenna that is stepped in an X-Y grid under the medical article tray 190. In this embodiment, the RFID reader 196 (FIG. 8) alternates RFID tag read commands between a first antenna 232 and a second antenna 234. In the figures, reference numeral 234 points to only one element of the second antenna to preserve clarity in the drawing. However it is meant to include all eight elements in the second antenna in this embodiment. This process is performed at each reading point in the X-Y grid.

Figure 14:
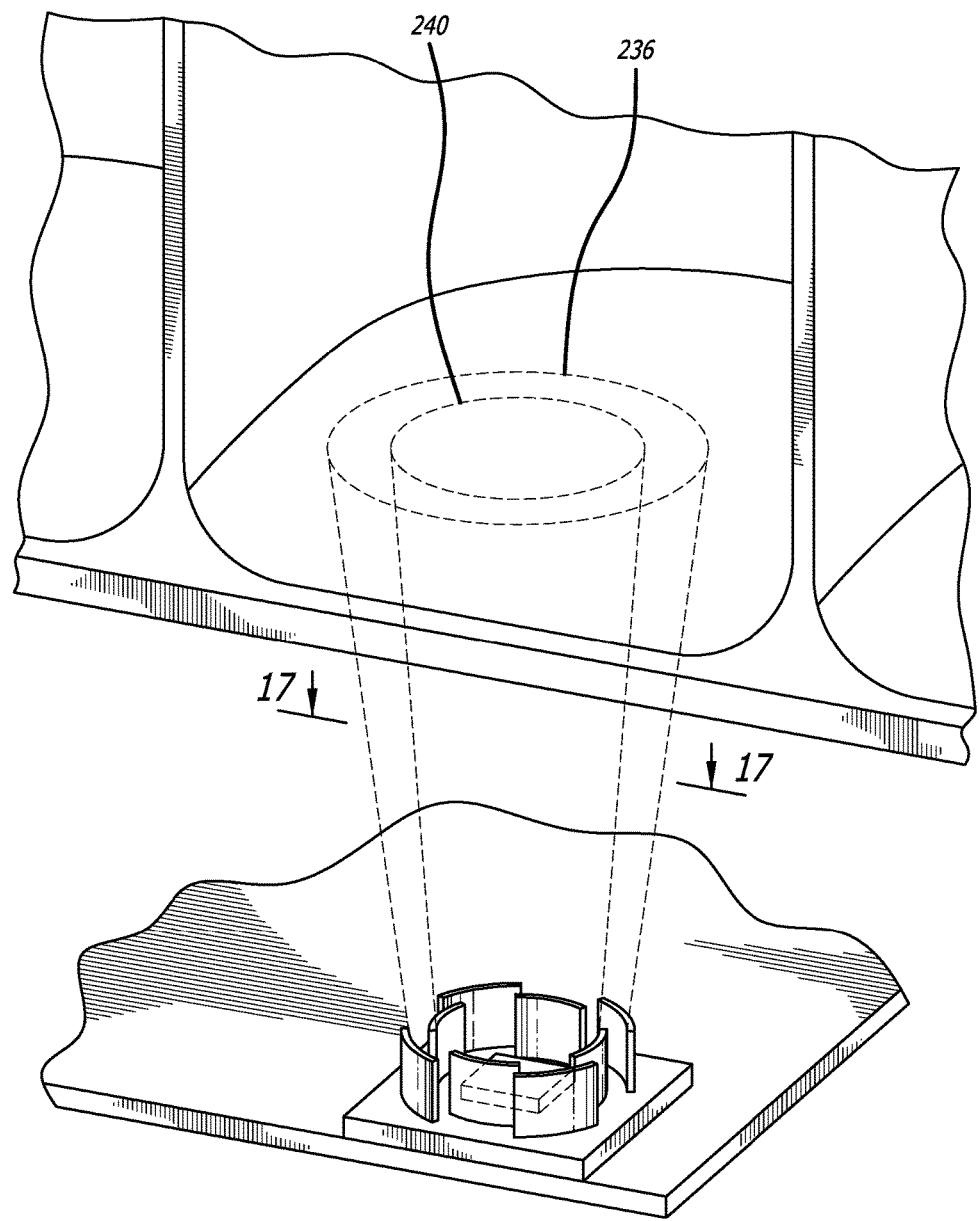
FIG. 14 is a perspective view of the overlapping energy patterns shown in dashed lines of the dual antenna of FIG. 12 directed at a pocket for reading any RFID tags on medical articles disposed in that pocket.
Figures 15, 16:
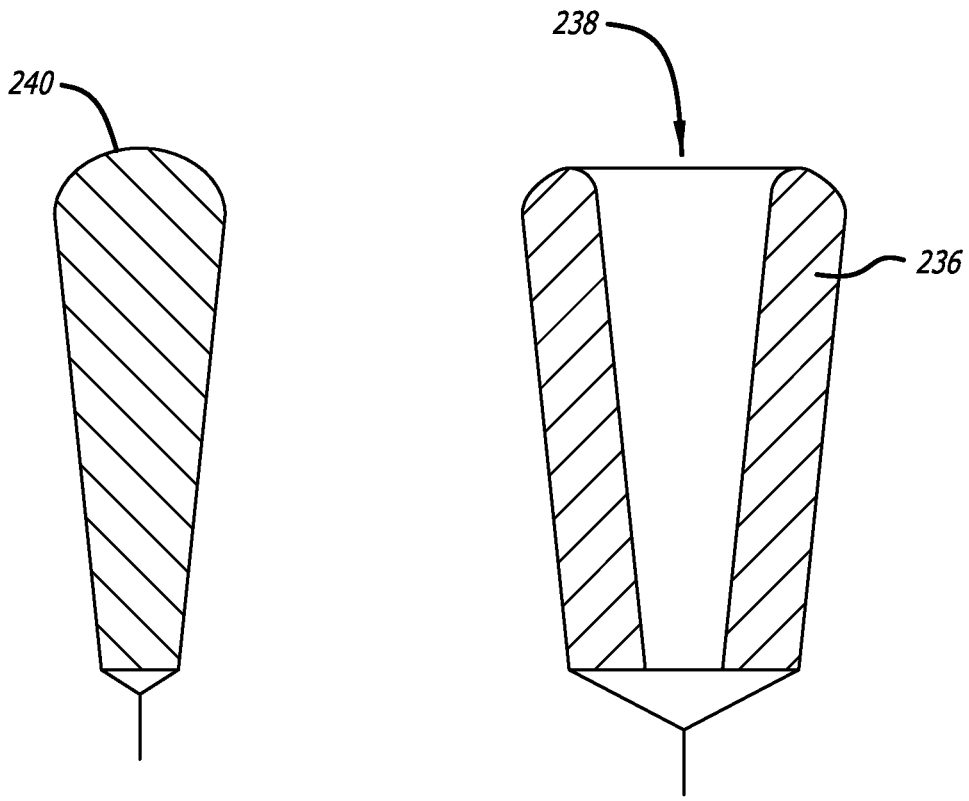
FIG. 15 is an illustration of the RF field energy pattern of the first antenna (Antenna A) in the dual antenna device of FIG. 12.
FIG. 16 is an illustration of the RF field energy pattern of the second antenna (Antenna B) in the dual antenna device of FIG. 12 showing an energy null at the center of the antenna.
Figure 17:
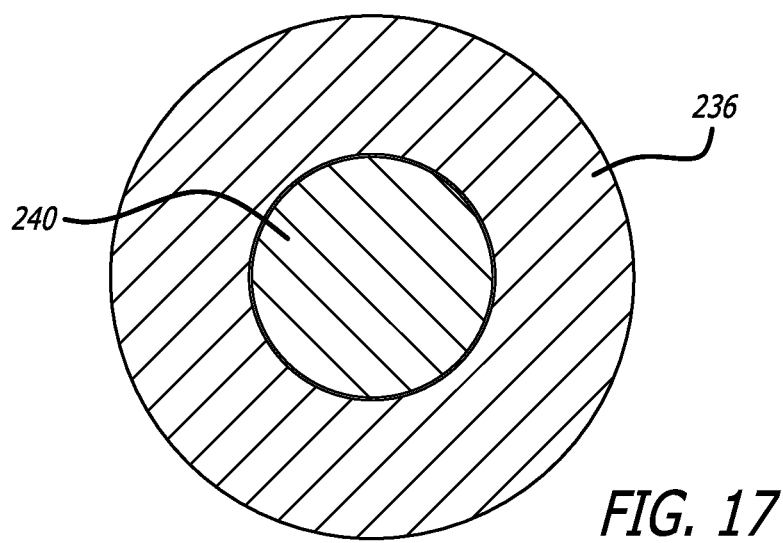
FIG. 17 is a top view of the RF field energy patterns transmitted by the two antennas (Antenna A and Antenna B) that are co-located and coaxial as shown in FIG. 12A, showing that the energy pattern of the second antenna (Antenna B) surrounds the energy pattern of the first antenna (Antenna A)

As can be seen in FIGS. 12C, 14, 16, and 17, the second antenna has distinct RF field pattern 236 (or forward radiation beam pattern) with a null area 238 (a zone where there is very little RF energy/insufficient energy to read a passive UHF RFID tag) in the center of the antenna radiating pattern. The first antenna 232 on the other hand has a centered beam 240 with no null as shown in FIGS. 12B, 14, 15, and 17. The illustrated dual antenna is a type C antenna. Both antennas are co-located and are centered with each other. Another description of their configuration is that they are coaxial (with each other) because they both have the same center axis. As shown in FIG. 17, the RF field pattern 236 of the second antenna 234 that is depicted in FIG. 16 is centered on the RF field pattern 240 of the first antenna 232 that is depicted in FIG. 15, with the null area in the center of the forward radiation beam pattern. Assuming that the RF field patterns of the first antenna and second antenna are exactly the same shape, except for the null area of the second antenna, a tag which is read by the first antenna but not the second antenna is located directly above the center of the dual antenna.

In one embodiment, the size of the null area 238 (FIGS. 12C and 16) may be approximately the size of a pocket. In another embodiment, the null area can also be less than the size of the pocket, for example one-fourth the size of the pocket or one-eighth the size of the pocket. In the embodiment of FIG. 14, detection resolution is increased because a small null area is used to detect and identify RFID tags. However, mechanical movement of the dual antenna would be necessary to move the null area multiple times throughout each pocket to detect and identify all RFID tags located there.

In one embodiment of the dual antenna approach 230 to verifying the pockets in which tagged medication resides, the dual antenna board 198 is stepped in an X-Y grid under the tray in which is stored RFID tagged medical articles. The RFID reader attempts to identify tagged medical articles using the first antenna 232 in transmit/receive made and the second antenna 234 in transmit/receive mode at each step in the X-Y grid. The distance between steps in the X-Y grid will be a function of tray density, tag type, and RF field size. At each step in the X-Y grid, each tag identified by the reader will be recorded along with the RSSI value and the number of times read. It may be necessary to perform the RFID tag read command several times at each read point in the X-Y grid and at different RF power levels to collect all the data required to accurately calculate the pocket in which a RFID-tagged medication resides.

In a second embodiment of the dual antenna approach, the dual antenna is scanned in an X-Y grid underneath the medication and does not stop at read points. The same data and variables described above apply to this embodiment.

Figure 18:
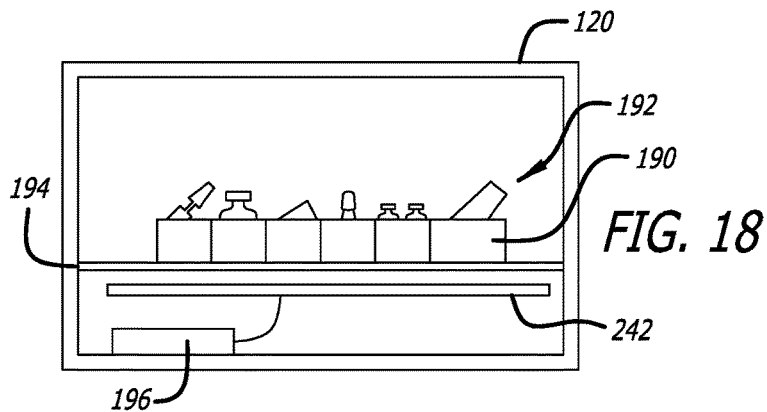
FIG. 18 is a front block diagram of a large PCB having a matrix or array of antennas mounted to a printed circuit board ("PCB") located below a false bottom in a container with a tray of pockets having medical articles each with an RFID tag resting on top of the false bottom.

In another embodiment of the system as shown in FIG. 18, a large printed circuit board ("PCB") 242 having antenna patterns and located under the false bottom 194 of the enclosure 120, and having at least one antenna corresponding to the location of each medication tray pocket in the tray 190 above the false bottom, is employed to identify the tags in the pockets. A system of RF switches residing on the same printed circuit board would be employed to select an antenna from which to identify RFID tags in the tray above the false bottom. The system would cycle through all antennas on the printed circuit board identifying RFID tags and storing the ID and RSSI values for each tag identified. In one embodiment, RF power conducted to each antenna would be constant. In another embodiment, tag IDs and RSSI values would be collected at each antenna in the matrix at different power levels. The tag IDs and RSSI values are analyzed, following the collection of tag IDs and RSSI values at each antenna to determine which tags reside in the individual pockets of the tray containing medication.

Figures 19, 20:
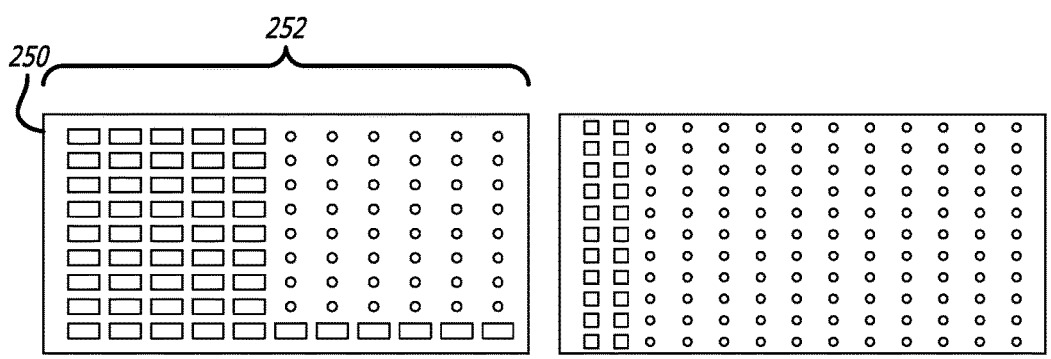
FIG. 19 shows a top view of a first embodiment of an array of antenna elements on the PCB of FIG. 18.
FIG. 20 shows a top view of an alternate embodiment of an array of antenna elements on the PCB of FIG. 18.
Figure 21:
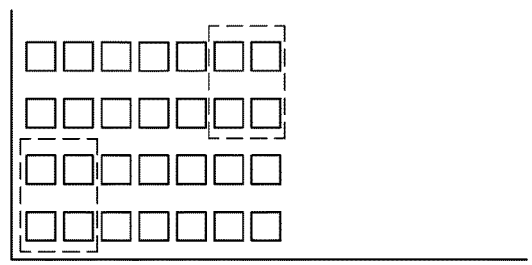
FIG. 21 shows a top view of an embodiment depicting how multiple antenna elements in FIG. 20 are combined through an RF switch network to form one radiating element.

In another embodiment of the invention as shown in FIGS. 19-21, a large PCB 250 is patterned with a matrix or array 252 of antenna elements, none of which alone form a radiating element, but when combined together form a radiating element which is able to transmit the energy and signals necessary to activate and identify RFID tags. As in the previous embodiment, RFID tag IDs and RSSI values are analyzed to determine the location of the RFID tag in the medication tray. FIG. 20 shows a matrix or array 244 of antenna elements on the PCB of much smaller elements than those of FIG. 19, where no one element is capable of providing energy to a tag or communicating with a tag. FIG. 21 is a magnification of the PCB of FIG. 20 that illustrates that elements are combined through an RF switch network to form one radiating element. In the example shown by FIG. 21, four elements combine to form one radiating element (antenna).

Figure 22:
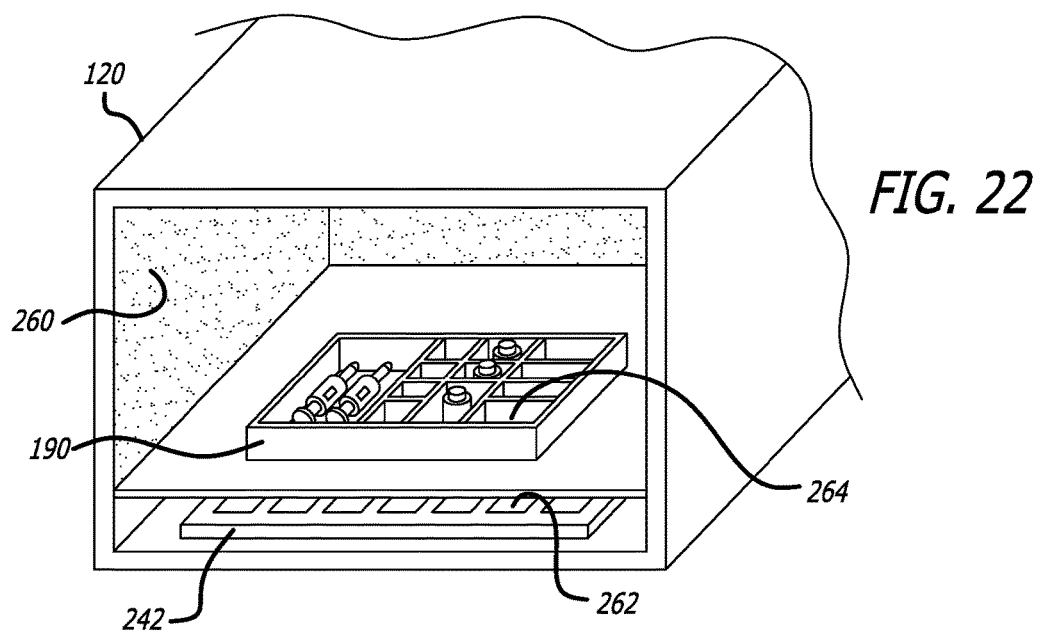
FIG. 22 shows a front perspective view of the enclosure of FIG. 3 with the front door removed showing the false bottom on which is resting a tray of pockets with medical articles in the pockets, each medical article having an RFID tag, and showing an antenna array located below the false bottom, the figure also showing RF absorbent material mounted on the internal walls of the container which operates as a Faraday cage, the RF absorbent material functioning to attenuate reflections of RFID tag activating energy inside the enclosure to lessen any effects of multipath.

FIGS. 22-26 illustrate different embodiments of the enclosure 120. The multipath characteristics of 915 MHz RF energy facilitates the identification of a large number of RFID tags in an RF enabled shielded enclosure due to the fact that energy transmitted from one antenna will reflect off the metal/shielded surfaces and read tags throughout the enclosure and not just directly in front of the antenna. This multipath characteristic at some RF power levels will make it difficult to identify those RFID tags directly in front of, or in close proximity to the read antenna. Therefore, as can be seen in FIG. 22, one embodiment of the invention would include RF absorption material 260 inside the enclosure 120 and above the medical articles tray 190. This absorbent material would reduce or eliminate the multipath characteristic of 915 MHz energy and therefore confine the tag identification to an area in close proximity to the read antenna 262 (i.e. the pocket directly above the antenna in the medication tray pocket 264.)

Figure 23:
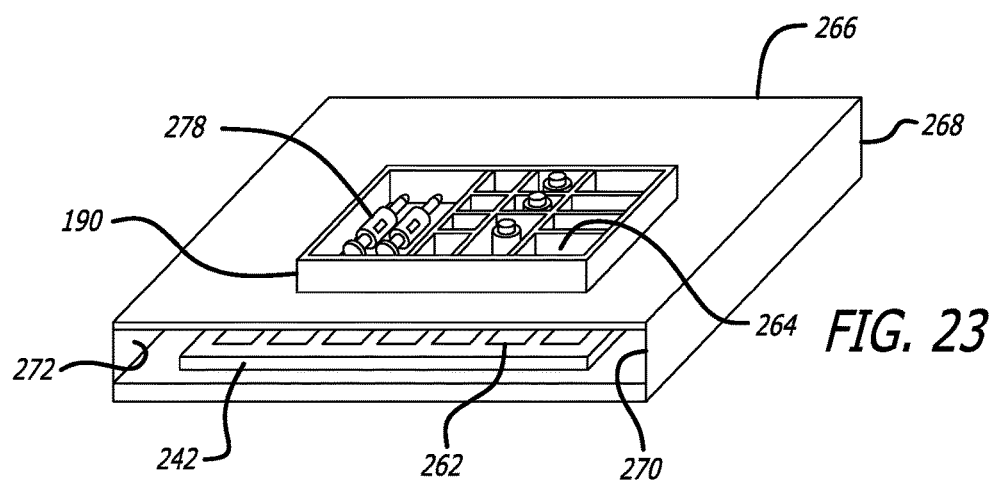
FIG. 23 shows a perspective view of a tray reader device similar to that of FIG. 22 except that a container is not used to surround the tray of pockets having medical articles with RFID tags for identification.

In another embodiment of the invention, as shown in FIG. 23, the enclosure 120 (FIG. 22) around the medical articles tray is eliminated altogether in order to eliminate reflections in close proximity to the read antennas 242. Instead, an open surface 266 is provided upon which to place the medical articles tray 190 above an antenna array. The open surface is the top of a smaller enclosure 268 having an opening 270 and an interior space 272 in which only the antenna array 242 and reader (not shown) are housed.

Figure 24:
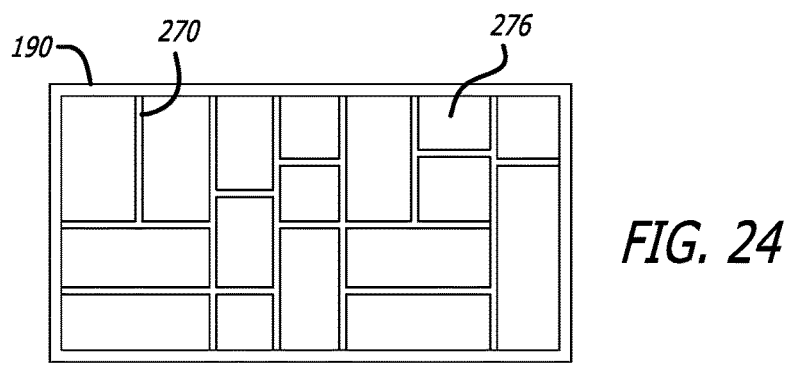
FIG. 24 shows a top view of a tray having metal or otherwise shielded dividers forming pockets with some pockets having different sizes and shapes compared to other pockets.

In one embodiment the invention, as shown in FIG. 24, the medical articles tray 190 comprises RF transparent plastic and contains pocket dividers 270. The pocket dividers form pockets 276 in the tray into which medical articles 278 may be stored as is shown in FIG. 23. In another embodiment of the invention, the tray is composed of RF transparent plastic but the pocket dividers are composed of metal or plastic shielded by an electrically conductive material. These shielded dividers isolate the RF energy in one pocket so that RFID tags can be identified in one pocket at a time. Although reference numeral 270 only points to one divider, and reference numeral 276 only points to one pocket, these numerals are meant to indicate all dividers and pockets respectively in the tray. Additional numerals and lead lines have not been drawn on the figure so as to preserve its clarity.

Figure 25:
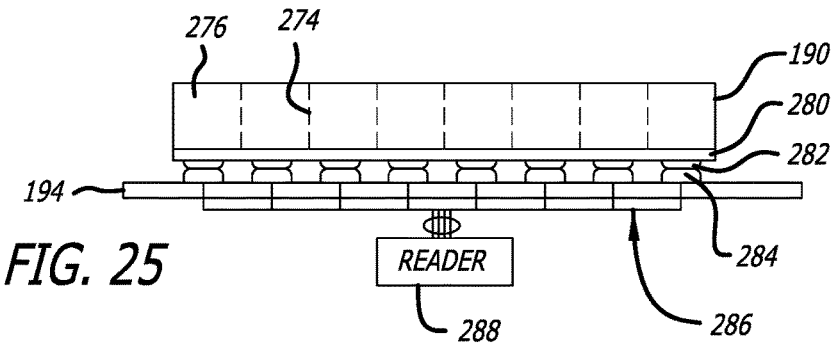
FIG. 25 shows a front block diagram view of an enclosure of FIG. 3 with the container sides removed, and showing the false bottom on which a tray with pockets for storing medical articles having RFID tags for identification with connectors for contacting contacts of an RFID reader located under the false bottom. In this case each pocket of the tray has a built-in antenna with an antenna contact underneath each pocket for conducting the antenna signals to and from the built in antenna.

In another embodiment of the invention, as shown in FIG. 25, the base 280 or floor of the medication tray 190 is composed of the antenna PCB 280 and the dividers 274 in the tray are RF transparent plastic or metal/shielded material. The antenna PCB places an antenna in each pocket 276. Electrical contacts 282 are mounted to the bottom of the medication tray PCB to conduct energy to and from the antennas located in the pockets. The false bottom 194 of the enclosure 120 (not shown) includes complementary electrical contacts 284 positioned to contact the antenna PCB contacts 282 when the tray is properly positioned in the enclosure 120 (FIG. 4. The recess 130 formed in the false bottom 128 shown in FIG. 4 would assist with proper alignment. Below the false bottom are electrical contacts or conductors for conducting energy to the RFID reader 288.

Figure 26:
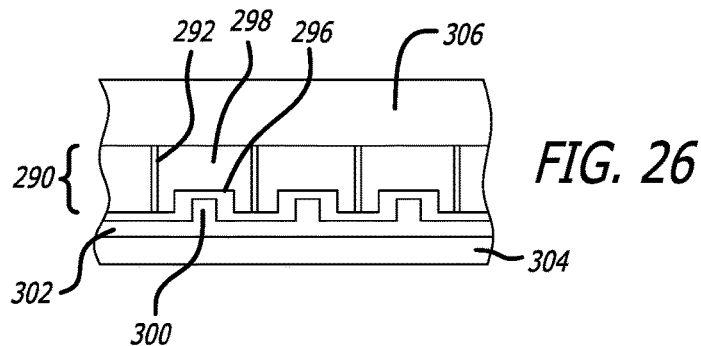
FIG. 26 shows a front of the container of FIG. 3 not showing the top, bottom, or sides of the container, but in which this embodiment of the pockets has a depression in the bottom of each pocket for receiving an antenna protrusion into the pockets.

In another embodiment of the invention, as shown in FIG. 26, the medication tray 290 is composed of RF transparent plastic and the pocket dividers 292 are composed of metal or plastic with embedded electrically conductive shielding material. The base of the tray includes a depression 296 for each pocket 298 that extends upward into the pocket. The depression can take the shape of a small cylinder to a shape extending across the entire base of each pocket and having a height of 0.100" to 0.250" (2.54 mm to 6.35 mm). The depression in each pocket matches the location of an antenna 300 that is positioned on an antenna PCB 302 positioned on the RF enabled enclosure false bottom 304. The medication tray is placed onto the base of the enclosure, and antennas in the base fit into the depressions beneath and/or inside each pocket. As the enclosure door is closed, an RF absorbent material 306 is lowered onto the top of the medication tray. The absorbent material prevents the RF energy transmitted in one pocket from reflecting off the enclosure walls and reading RFID tags in adjacent pockets.

Figure 27:
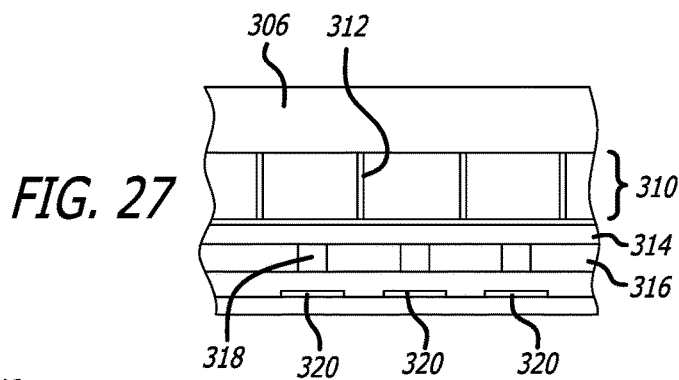
FIG. 27 shows a front perspective view of the container of FIG. 3 not showing the top, bottom, or sides of the container, but having slots or "leak features" through RF energy guide material located below the false bottom through which activating RF energy from antennas below the false bottom is conducted to activate the RFID tags attached to medical articles in the pockets. A guide slot is located beneath each pocket. RF absorbent material is located over the pockets to lessen any effects of multipath.

In another embodiment of the invention, as shown in FIG. 27, the medication tray 310 is composed of RF transparent plastic and the pocket dividers 312 are composed of metal or plastic with embedded shielding material. The base of the tray is RF transparent material. The false bottom 314 in the enclosure is composed of RF transparent material. Directly beneath the false bottom is a PCB 316 (printed circuit board) which is at least the size of the medication tray and having a means of transmitting RF energy from below the PCB into the center of the each pocket in the tray. In the case of a tray with forty-eight pockets arranged in an eight pocket wide by six pocket deep configuration (pocket size approximately 2"×2" (5 cm×5 cm)), the PCB would include forty-eight features 318 that align directly with the center of each tray pocket. The feature in the PCB is engineered to "leak" or transmit RF energy from below the PCB into each pocket for the purpose of identifying RFID tags in one pocket at a time. The source of the RF energy can be a single source, multiple sources, or one source 320 for each pocket. The feature in the PCB "leaks" or transmits RF energy by means of a matrix of switches, which apply a voltage or current into the matrix to activate one PCB "leak" at a time.

Figure 28:
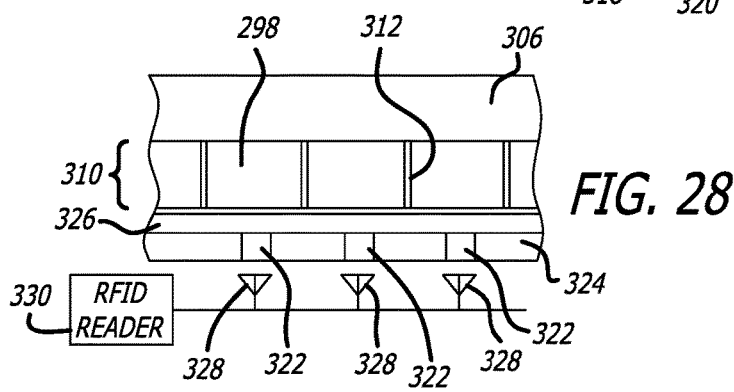
FIG. 28 shows a configuration similar to FIG. 27 in which individual antennas are used below the false bottom and in which the guide material comprises a metal layer with slots used for RF energy control, showing an antenna below each of the slots in schematic form.

In another embodiment of the invention, as shown in FIG. 28, the medication tray 310 base is composed of RF transparent material and the tray sides and pocket dividers 312 are composed of metal or RF shielding material. The tray is placed onto a predetermined position on the enclosure base 314. The pockets 298 in the tray align with a matrix of openings, slots 322, or orifices that are cut in a metal surface 324, as shown in FIGS. 28-29, which is positioned directly under the enclosure false bottom 326 or base. The openings or slots 322 can be opened or closed to RF transmission electronically by a digital switching matrix. In one embodiment, shown in FIGS. 30-31, a diode 332 is used to short one side of the slot 322 to the opposite side in order to close the slot to RF transmission.

The RFID reader 330 and transmission antennas 328 are located beneath the matrix of openings or slots 322. An RF absorbent material 306 is lowered over the tray 310 (covering the tray) to absorb any RF energy that radiates from the opening or slot through the pocket 298, and out the top of the pocket. This absorbent material will prevent RF energy transmitted into one pocket from reflecting off the enclosure walls and reading an RFID tag in another pocket. Medical article location is verified by opening the openings or slots under the pocket one at a time to allow RF energy to pass, leak, or escape into the pocket in order to read the RFID tags attached to the medical article.

FIGS. 32-36 describe several embodiments of a method for activating and deactivating a transmission path for 915 MHz RF energy to identify RFID tags in a pocket that is isolated from adjacent pockets by shielded dividers in a tray.

FIG. 32 illustrates an embodiment of the invention having a read antenna 340 and a transmission path gateway PCB 342 (antenna gateway device) positioned below an RF transparent tray base 344 of the tray. The antenna gateway device has openings 346 aligned in relation to each pocket 298 in the tray. The pockets are isolated from adjacent pockets by electrically conductive shielded dividers 312. A RFID reader 330 receives read data from RFID-tagged medical articles in the pockets responding to RFID activating energy from the antenna.

In the embodiment of FIG. 32, the transmission slots [openings] 346 can be opened or closed to RF transmission. FIG. 33 shows an example where one opening 346 has an active transmission path [operable state] and one opening 347 has an inactive transmission path [inoperable state]. The forward radiation beam pattern (indicated by dashed lines) of the antenna 340 is allowed to transmit through the active transmission path into the selected pocket 298, and is blocked from transmitting through the inactive transmission path into the adjacent pockets.

FIGS. 34 and 35 illustrate the top layer and inner layer of the transmission path gateway PCB 342 depicted in FIG. 32, respectively. As shown in FIG. 34, each metal pattern aligned in relation to each pocket has a transmission slot 350 through which the forward radiation beam pattern of the antenna can be allowed to be transmitted. The metal patterns are isolated from each other through a ground feed through array. As can be seen in FIG. 35, the forward radiation beam pattern is transmitted through a transmission path gate in the inner layer of the transmission path gateway. The ground feed through array 352, shown as circles, includes a plurality of ground pads 354 surrounding each metal pattern. Feedthroughs 356 inside the transmission path gateway PCB 342 carry an electric ground from ground pads on one side of the transmission path gateway PCB to the ground pads on the other side. These ground pads serve to isolate each metal pattern so that the forward radiation beam pattern of the antenna does not access other adjacent pockets.

Figure 36:
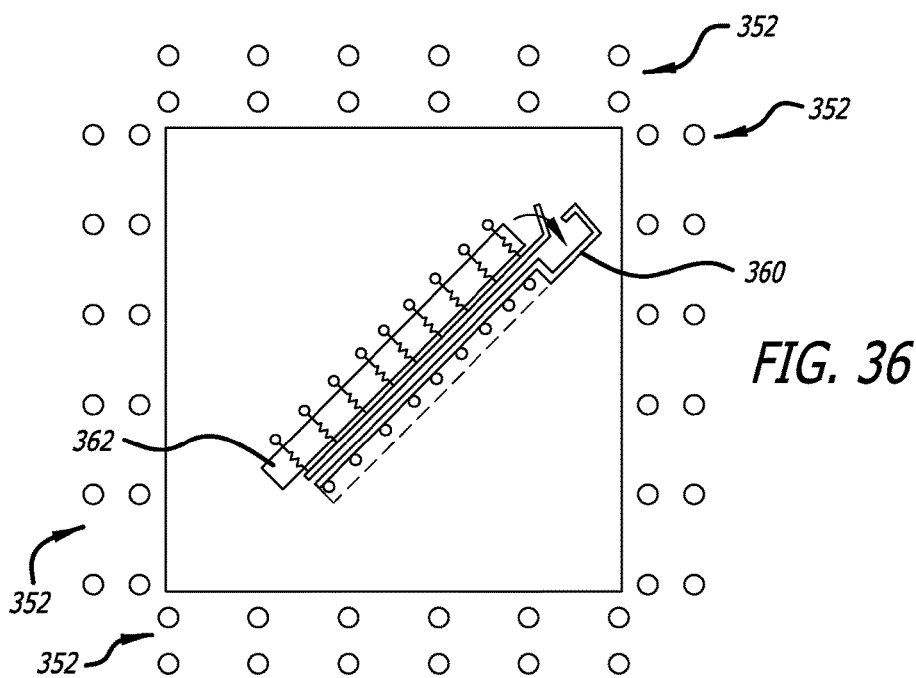
FIG. 36 shows a top view of an inner layer gate having a transmission slot such as that shown in FIG. 34 with a controller switch for the transmission path gateway (slot) in the plate.

FIG. 36 illustrates a closer top layer view of the center metal pattern depicted in FIG. 33 to illustrate an inner layer gate and switch 360 that controls whether the transmission path is open or closed to RF transmission (in response to gateway switch control signals sent by an antenna gateway controller). The transmission slot 362 is surrounded by ground pads. In FIG. 36, the switch is shown in the open position. When the switch is closed (closed state), the transmission path becomes closed to RF transmission. When the switch is open as shown in the drawing (open state)], the transmission path becomes open to RF transmission.

Figure 37:
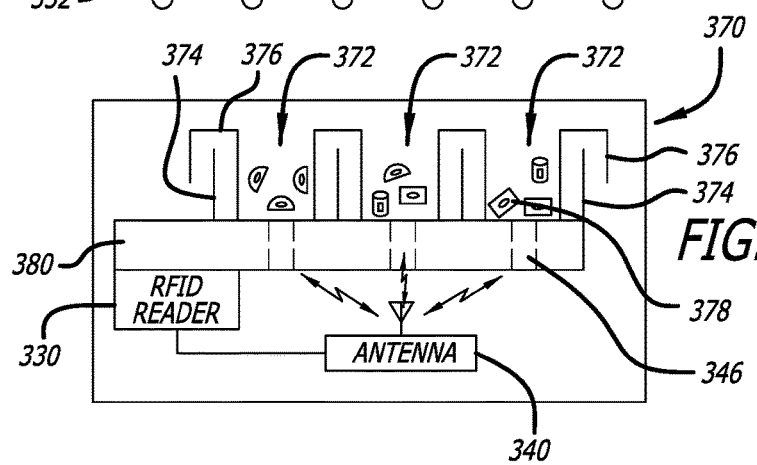
FIG. 37 shows a cross-section view of a tray with pockets for storing medical articles wherein the tray and pockets are formed of an electrically non-conductive material, such as a plastic or cardboard, and a metal or metalized lid placed on top of the pockets of the tray wherein the lid has four electrically conductive sides that extend into the pockets and an electrically conductive top to provide EM isolation of the pocket so that RFID activating energy injected into the pocket will not reach adjacent pockets and likewise RFID signals provided by activated RFID tags in the pocket will not reach adjacent pockets.

FIG. 37 illustrates an embodiment of the invention. One embodiment of the medication pocket verification invention is a low cost system for tracking patient compliance in a nursing home, retirement home, or domicile. A matrix 370 of thirty-six shielded pockets 372 therein formed from thin plastic 374 and then metallized 376 provides pockets for each day of the month. The 6×6 array of small pockets, each capable of storing up to six medications 378 in blister pack form factor, is attached to a printed circuit board which includes thirty-six RF gateways, an embedded control system, an RFID reader, and means of communicating by Ethernet, Wi-Fi, Bluetooth, or other. Medication is delivered to the patient preloaded into a cardboard or plastic egg crate style container configured in a 6×6 array and matching the array of pockets in the verification system. The egg crate container nestles into the verification pockets. The patient closes the verification enclosure and the system automatically identifies the medication and reports that the medication had been received by the patient. Each time the patient opens the verification enclosure to retrieve medication the system reads upon closure and reports the time and date that medication was removed.

Figure 38:
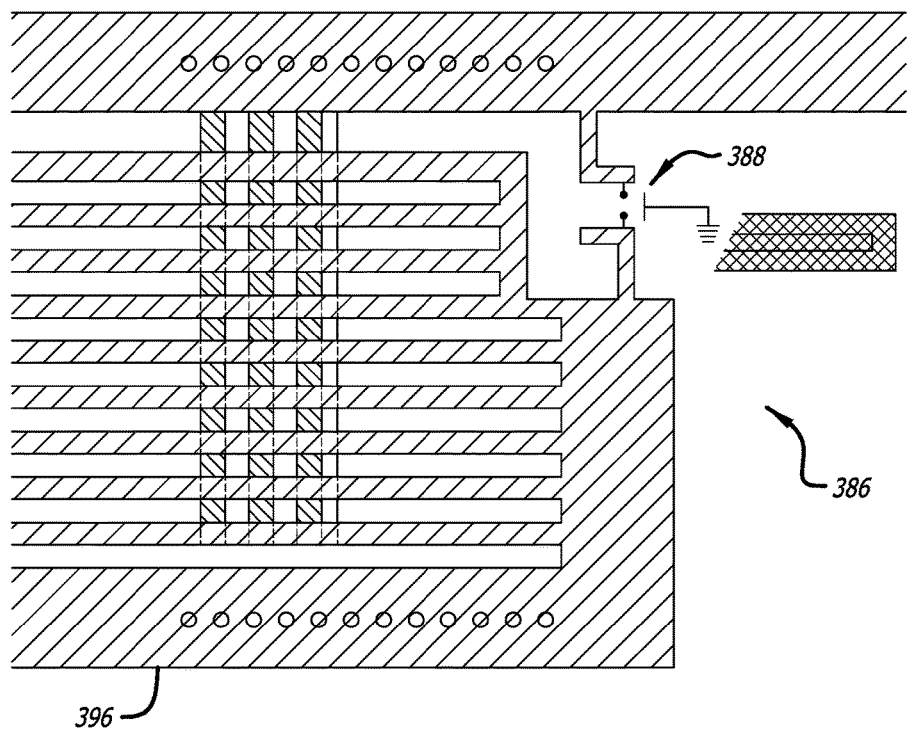
FIG. 38 shows an embodiment of an RF energy gate for RF transmission.

FIG. 38 describes an embodiment of an RF energy gate 386 that can be reduced to practice on multiple layers of a printed circuit board. The embodiment is based on a normally closed three-way switch 388 that connects two arrays of metal traces on two different PCB layers that are perpendicular to one another to a ground reference when closed and thus blocks RF energy that would otherwise propagate through the pattern. The pattern shown in FIG. 38 would be printed on multiple layers of a PCB and would fill the gap of a slot or some other orifice designed to transmit RF energy into a small pocket containing articles with RFID tags.

Figure 39:
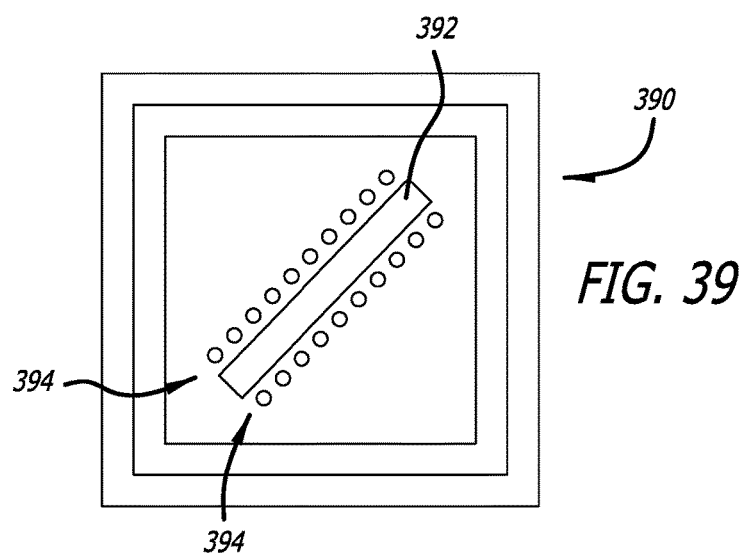
FIG. 39 shows a top view of the RF gateway of FIG. 38 enlarged to show the metal plate and further showing a ground surface surrounding the plate.
Figure 40:
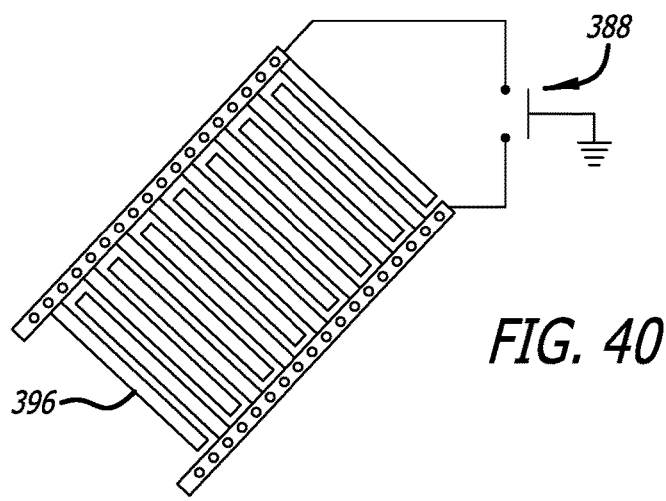
FIG. 40 shows a system of controlling an RF gateway.
Figure 41:
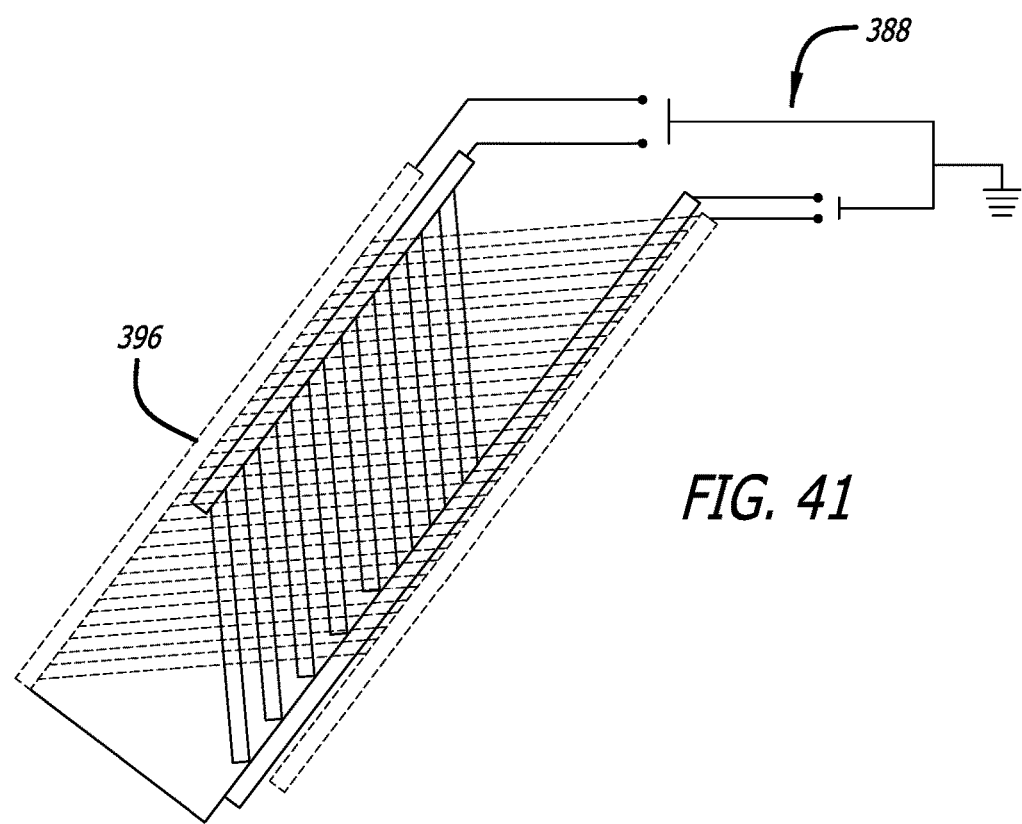
FIG. 41 shows an alternate system of controlling an RF gateway.
Figure 42:
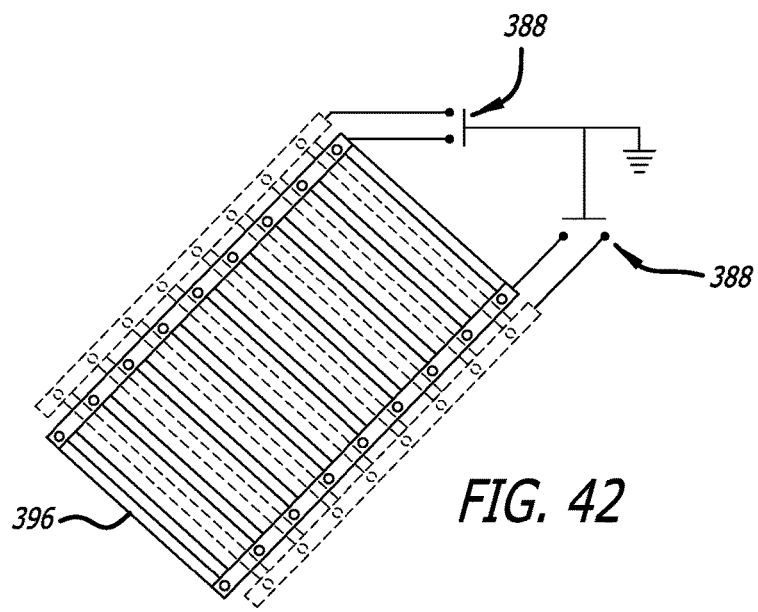
FIG. 42 shows yet another alternate system of controlling an RF gateway.

FIG. 39 shows a PCB 390 having a diagonal slot 392 with electrical conductors 394 surrounding the longer aspect of the slot. Similarly, FIGS. 40-42 illustrate other embodiments of arrays 396 of metal traces and grounds with switches 388 that, when closed, would block transmission of RF energy through the RF transmission gateway of FIG. 39.

Figure 43:
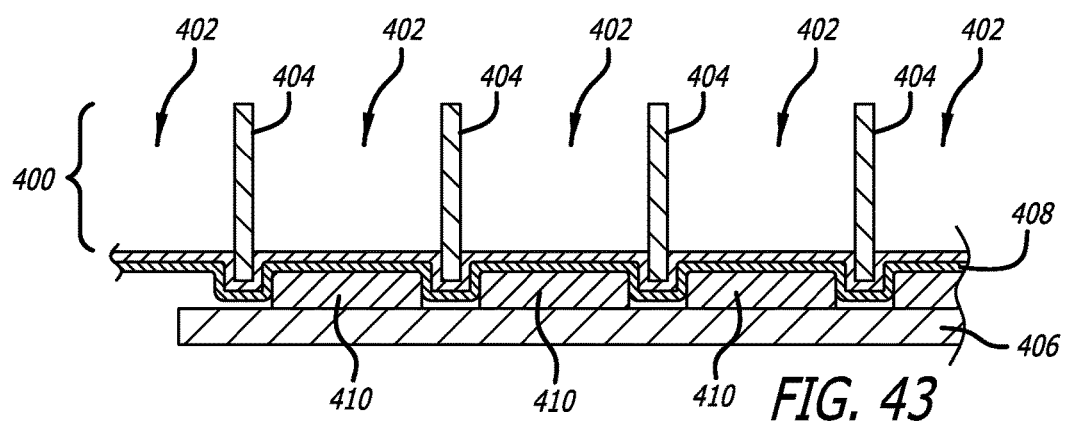
FIG. 43 shows a side cross-section view of the design of a tray having electrically conductive walls that create pockets in the tray to store medical articles, the walls mounted to an RF transparent base such that there is an indentation at the base of every pocket into which an antenna may extend, also showing a false bottom of a container formed to accept tray at the top of the false bottom and accept reader antennas at the bottom of the false bottom, and showing an antenna array printed circuit board located underneath the false bottom with antennas position such that the array provides at least one antenna in each indent under a pocket.
Figure 44:
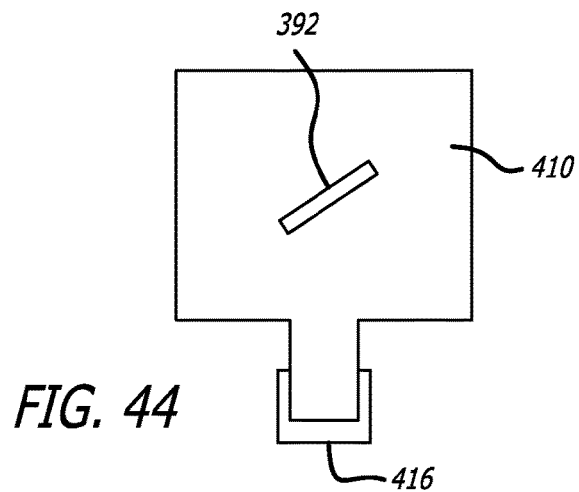
FIG. 44 shows a top view of a patch antenna formed of a silver ink or a thin film circuit connected to a printed circuit board ("PCB") pad.
Figure 45:
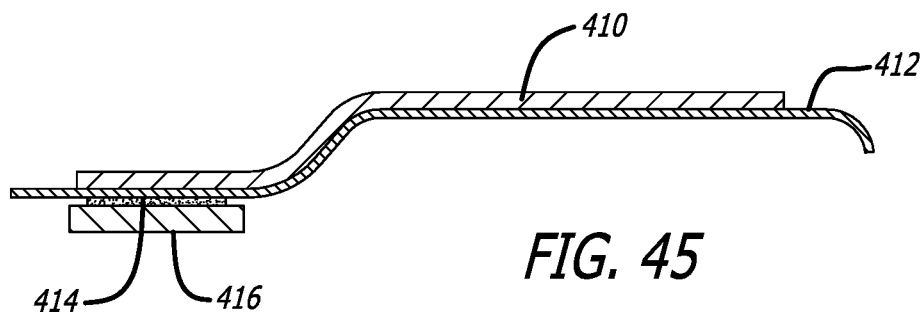
FIG. 45 shows a side view of the patch antenna of FIG. 44 showing the thermoformed antenna substrate, the PCB pad and an adhesive used to mount the antenna and substrate to the PCB pad.

FIGS. 43 and 44 illustrate another embodiment of the enclosure with an RF transparent tray 400 having pockets 402 separated by metal or shielded tray dividers 404. The enclosure has an antenna array printed circuit board 406 connected to a reader (not shown), both of which are positioned underneath the false bottom 408 of the enclosure. Thermoformed patch antennas 410 are aligned in relation to each pocket 402 to read RFID-tagged articles in the tray 400. As shown in FIG. 45, each patch antenna 410 has a thin film or silver ink that covers a thermoformed antenna substrate 412. The thermoformed antenna substrate is connected using an adhesive 414 to a PCB pad 416 situated on the PCB 406.

Figure 46:
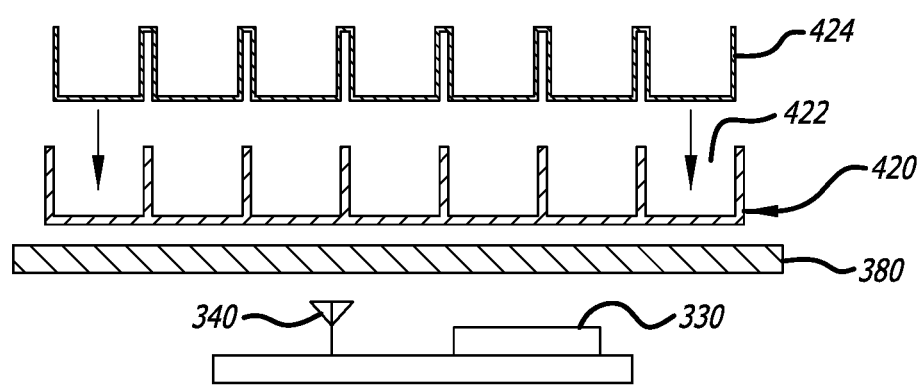
FIG. 46 is a side view of a tray with walls forming pockets in the tray to store medical articles having RFID tags, the tray in this embodiment is formed of a non-electrically conductive material, also showing an RF gateway below the tray to control the beam of an antenna or antennas, and showing an RFID reader located below the gateway, further showing above the tray an electrically conductive isolation lid that provides an arrangement of walls that extend into the pockets of the tray when the isolation lid is lowered over the tray, the isolation lid forming four electrically conductive walls in each pocket and an electrically conductive lid similar to FIG. 37 where each pocket is now isolated in the form of a partial Faraday cage so that precise activation of RFID tags in only one pocket of the tray at a time can be achieved.

A variation of an embodiment of the invention used by hospitals to track drugs and medication in a variety of non-metallic trays is a verification system for tracking medication in a nursing home, retirement center, or domicile. As illustrated in FIG. 46, a verification tray 420 having a quantity of pockets 422 greater that thirty-one (the maximum number of days in a month) is assembled using methods previously discussed. Medication is delivered to a patient, clinic, or nursing home in a thin plastic or cardboard container 424 having pockets that match the positions of the pockets in the verification system. The plastic or cardboard pockets are smaller and shorter than the pockets in the verification tray such that the medication tray nestles into the verification tray. Once the medication tray is loaded into the verification tray, the verification system monitors or tracks the removal of medication from the system on a pocket by pocket basis (i.e. day-by-day basis). If a medication is not removed by a certain time each day, a patient can be reminded by a relative, healthcare professional, or other care-giver that it is time to administer the medication.

The invention applies to a system where medical articles are placed in the pockets, or specific locations, of containers used in a process or operation in which the predetermined location of the article is critical to the accuracy and efficiency of the process or operation. As an example, the location of an article in the correct pocket of a tray used to store anesthesia medication is critical to the process of administering the correct medication to a patient in a timely manner during an operation. The administration of an incorrect medication could result in a serious medication error resulting in long term health complications or death. The invention provides an RFID system and method for verifying that articles tagged with RFID smart labels are located in their assigned pockets.

Figure 47:
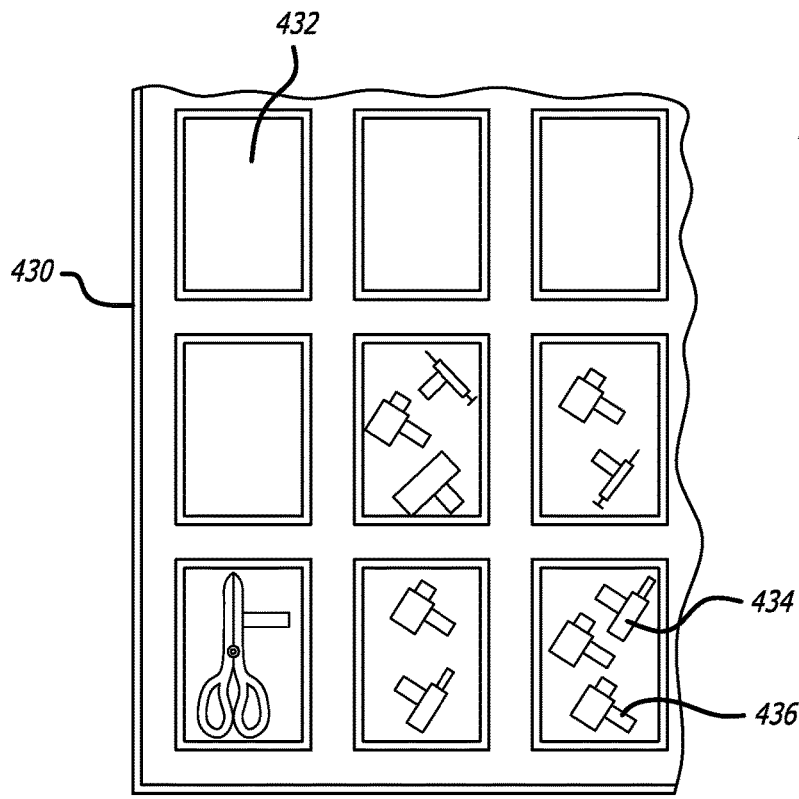
FIG. 47 is a top view of a tray having individual pockets in which medical articles are stored, each medical article having an RFID tag, each pocket being separated from other pockets by space between their walls, and the tray and pocket walls being formed of a non-electrically conductive material, such as plastic or cardboard.
Figure 48:
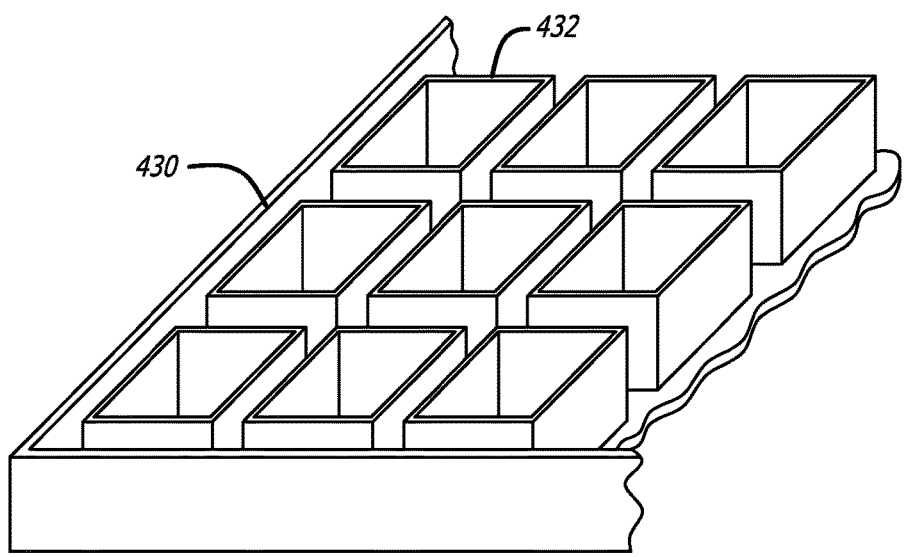
FIG. 48 is a front perspective view of the tray of FIG. 47 showing the separation of the pockets in the tray with the stored and RFID tagged medical articles of FIG. 47 being removed.

Turning now to FIG. 47, a top view of a medical article storage tray 430 is shown. The tray has a plurality of pockets 432 each of which can store medical articles 434. Each of those medical articles has an attached RFID tag 436 to identify the medical article for tracking purposes. It will be noted that the pockets are spaced apart from each other on the tray. This is also shown in FIG. 48 which is a front perspective view of part of the tray. In this embodiment, the tray and pockets are formed of a relatively inexpensive plastic material that is RF transparent. Such trays can provide enormous amounts of use and are very durable. They are relatively inexpensive and can be easily replaced if broken.

To be able to check pocket-by-pocket of such a tray 430 so that only one pocket is checked at a time, an electrically shielding arrangement is needed. As shown in other drawings and described above, an antenna system and RFID reader system in accordance with the invention can be focused pocket-by-pocket; however, it is necessary to be sure that activating energy from an RFID reader antenna only activates the RFID tags in the target pocket and does not activate RFID tags in other pockets. If RFID tags in multiple pockets are activated simultaneously, the RFID reader system will not be able to determine which medical articles reside in the target pocket and which do not. Knowing accurately what medical article or articles are in a particular pocket and what are missing from that pocket is important for code trays, especially those used for emergency procedures.

Figure 49:
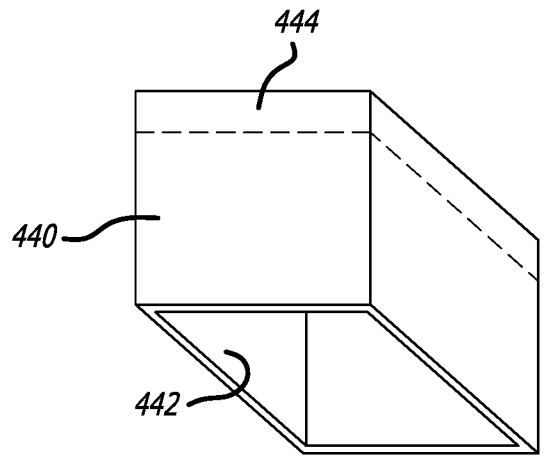
FIG. 49 shows an isolation lid for covering a pocket such as that shown in FIG. 48 to isolate the RFID activation energy or RFID tag response signals in a particular pocket from reaching another pocket, the lid having electrically conductive sides and in this case, RF absorbent material mounted inside the lid at the top surface.
Figure 50:
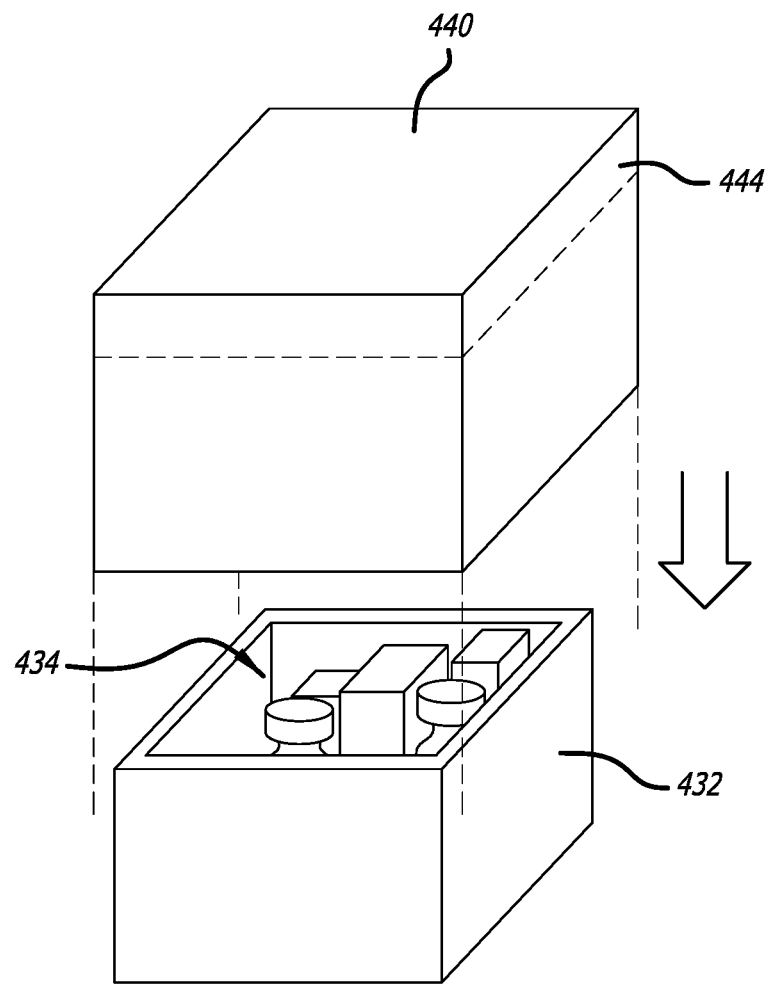
FIG. 50 shows the placement of the RF isolation lid of FIG. 49 over a pocket of FIG. 47 so that RFID activation energy may be injected into the pocket of the tray and that energy will be confined to only the target pocket and will not enter an adjacent pocket.

In accordance with an embodiment of the invention, an electrically shielded pocket cover 440 is provided as shown in FIGS. 49 and 50. This pocket cover has an interior space 442 large enough to completely fit over a pocket of the tray shown in FIGS. 47 and 48. The pocket cover is made of electrically conductive material and forms a partial Faraday cage about the pocket over which it is placed. In this embodiment, the pocket cover also includes RF absorbent material 444 indicated by dashed lines. FIG. 50 shows the pocket cover being installed over one of the pockets of FIG. 48 that would cover the opening of the pocket. In a different embodiment, an array of pocket covers is formed in the same arrangement as the pockets of the tray shown in FIG. 48. The array of pocket covers can then be placed over a tray to isolate every pocket in the tray simultaneously. For that reason, the pockets in the tray must be spaced far enough apart from each other so that each pocket can be covered with a pocket cover at the same time as all other pockets are covered. This has the beneficial effect of providing electromagnetic isolation to every pocket at the same time so that an RFID antenna reader array described above can check each pocket accurately.

In the embodiment shown in FIGS. 47-50, the more expensive electrically conductive pocket cover array can be reused many times at the RFID reader while much less expensive trays are used for the day-to-day dispensing of medical articles for patients. Accuracy in tracking medical articles is greatly enhanced through the use of the array of electrically conductive pocket covers. As a result, each pocket is protected from stray RFID activating energy by two shields. The pocket into which RF activating energy is being injected has its own cover over it and the neighbor pocket also has its own cover thus providing two shields to prevent the inadvertent activation of neighboring RFID tags.

Additional features include using a transmit antenna designed with a high magnetic component. When paired with RFID tags attached to the medical articles where those RFID tags have primarily magnetic field antenna features, greater accuracy in activating RFID tags results.

In another feature, two transmit antennas are used. One antenna is designed with a high magnetic component and the second antenna is designed with a high near field electrical (E) field component. Pairing these antennas with the use of RFID tags on the medical articles that have both magnetic and electrical field antenna features results in more reliable activation of RFID tags in a container.

The above two features are usable with stationary antennas used with RF gateways that allow the RF energy to pass only into a specific pocket as described above and with antennas that move in an X-Y grid under or over a tray of medical articles to deliver RF energy to each pocket. Additionally, using these additional features with the arrangements of varying RF power level and the analysis of RSSI values to determine the location of an RFID tags can result in better detection of RFID tags in a container.

In yet another feature, an interference RF signal is injected into all pockets except for the target pocket where the RFID reader is identifying RFID tags attached to medical articles. The interference signal would interfere with the RFID tags' ability to receive or transmit information from the reader. The level of interference can be varied during the verification cycle and resulting data analyzed along with RSSI values to verify the location of a medication as is described above.

Accordingly advantages of the invention include conduct inventories more rapidly and improving the accuracy of tracking medical articles.

While the invention has been described in connection with what is presently considered to be the preferred embodiments, it is to be understood that the invention is not to be limited to the disclosed embodiments and elements, but, to the contrary, is intended to cover various modifications, combinations of features, equivalent arrangements, and equivalent elements included within the scope of the appended claims.

What is claimed is:

1. An inventory tracking system to determine the location of an article labeled with an RFID tag, the article being located in a pocket of a container having a plurality of pockets, each pocket having a size, the system comprising:
   a dual antenna comprising a first antenna having a first forward radiation beam pattern and a second antenna having a second forward radiation beam pattern that has a null area which is less than the size of a pocket;
   a movable antenna mount on which is mounted the dual antenna in a configuration in which the first forward radiation beam pattern of the first antenna overlaps the null area of the second forward radiation beam pattern of the second antenna, and wherein the antenna mount is controllably movable to radiate into a plurality of the pockets of the container;
   a controller programmed to activate the first antenna to transmit the first forward radiation beam pattern to a selected pocket and thereafter to read a first set of read data from any responding article labeled with an RFID tag, the controller also programmed to alternately activate the second antenna at the same pocket to transmit the second forward radiation beam pattern and thereafter to read a second set of read data from any responding article labeled with an RFID tag;
   an RFID reader connected to the dual antenna to receive the first set of read data from articles responding to the first antenna, receive the second set of read data from articles responding to the second antenna, and output the two sets of read data; and
   a processor that is programmed to receive the two sets of read data from the RFID reader, compare the first set of read data regarding RFID tags responding to the first antenna with the second set of read data regarding RFID tags responding to the second antenna, and based on the comparison, determine that the location of an RFID tag that responded to the first antenna but did not respond to the second antenna is in a particular pocket.

2. The inventory tracking system of claim 1 further comprising:
   a motor connected with the movable antenna mount to position the movable antenna mount in relation to a selected pocket in response to position control signals; and
   wherein the processor is further programmed to provide position control signals to the motor to position the mount in relation to the selected pocket.

3. The inventory tracking system of claim 2 further comprising:
   a display device responsive to display signals to visually present information;
   a memory in which is stored a position database of positions of each of the pockets of the container and an inventory database of the articles that are expected to be in each of the pockets;
   wherein the processor is further programmed to read the position database in the memory to determine the positions of each pocket and thereafter to provide position control signals to the motor to position the mount in relation to all pockets of the container and determine the actual contents of each pocket;
   wherein the processor is further programmed to read the inventory database in the memory to determine the expected contents in each pocket and thereafter to compare the actual contents of each pocket to the expected contents of each pocket to determine if articles should be added to or removed from each pocket; and
   wherein the processor is further programmed to provide display signals to the display device to control the display device to visually present information describing the articles that should be added to or removed from each pocket.

4. The inventory tracking system of claim 1 wherein a plurality of dual antennas are mounted on the movable antenna mount, each dual antenna having a known spatial distance from each other dual antenna, the known spatial distance between the dual antennas being selected to be consistent with spacing between the pockets.

5. The inventory tracking system of claim 1, further comprising a return signal strength indicator ("RSSI") module that receives RSSI data from the dual antenna and outputs the RSSI data to the processor.

6. The inventory tracking system of claim 1, wherein the first antenna and second antenna are co-located on the antenna mount in a configuration in which their center lines coincide.

7. The inventory tracking system of claim 2, wherein the processor is further programmed to provide position control signals in response to which the antenna mount moves among the pockets in a stepping grid pattern and stops at read points to read an article located in a pocket.

8. The inventory tracking system of claim 7, wherein the null area is about one-fourth to one-eighth the size of a pocket, and wherein the processor is further programmed to provide position control signals in response to which the movable antenna mount stops to direct the null area at multiple read points for each pocket to read the pocket.

9. The inventory tracking system of claim 1, wherein the processor is further programmed to provide position control signals in response to which the movable antenna mount moves among the pockets in a stepping grid pattern to read the articles while in motion without stopping at read points.

10. A method for determining the location of an article labeled with an RFID tag, the article being located in a pocket of a container having a plurality of pockets, each pocket having a size, the method comprising:
transmitting a first forward radiation beam pattern from a first antenna toward a selected pocket of the container and thereafter reading a first set of read data from any article labeled with an RFID tag;
alternately transmitting a second forward radiation beam pattern from a second antenna toward the selected pocket of the container, the second forward radiation beam pattern having a null area directed at the selected pocket, the null area being less than the size of the selected pocket at which the null area is directed, and thereafter reading a second set of read data from any article labeled with an RFID tag;
receiving the first set of read data from articles responding to the first antenna, receiving the second set of read data from articles responding to the second antenna, sending the two sets of read data to a processor, comparing the two sets of read data, and determining that an article identified to the first antenna but not identified to the second antenna resides in the selected pocket; and
moving the first and second antennas among the pockets of the container.

11. The method of claim 10, further comprising receiving return signal strength indicator ("RSSI") data into an RSSI module from the first antenna and the second antenna and outputting the RSSI data to the processor to determine the location of a responding RFID tag.

12. An inventory tracking system to determine the location of an article labeled with an RFID tag, the article being located in a pocket of a container having a plurality of pockets, the system comprising:
an antenna gateway device having openings, the antenna gateway device positioned so that the openings are aligned with respective pockets, the antenna gateway device having a side facing the pockets of the container and a side facing away from the pockets of the container, wherein a size of each of the openings is selected to allow radiation of a selected frequency range through the opening;
an antenna having a forward radiation beam pattern, the pattern being wide enough to radiate through all of the openings of the antenna gateway device, the antenna being located on the side facing away from the pockets of the container of the antenna gateway device, the antenna facing the antenna gateway device whereby the antenna gateway device provides control over the forward radiation beam pattern of the antenna to separate the beam pattern into separate beams that radiate through the openings of the antenna gateway device;
an antenna gateway controller that switches each opening between an operable state and an inoperable state such that when in the operable state, the radiation beam of the antenna at the selected frequency is allowed to radiate through the opening, and when in the inoperable state, the radiation beam of the antenna at the selected frequency is not allowed to radiate through the opening, the antenna gateway controller being responsive to gateway switch control signals to switch each opening between the operable and inoperable states;
a processor that is programmed to provide gateway switch control signals to the antenna gateway controller to switch the openings between the operable and inoperable states in response to programming under which some or all of the pockets are to be read, the processor also programmed to activate the antenna to transmit the forward radiation beam pattern through an opening of operable state into a particular pocket and thereafter to read a set of read data from any responding article labeled with an RFID tag; and
an RFID reader connected to the antenna to receive the set of read data from articles responding to the antenna and to output the set of read data to the processor which determines that articles responding to the antenna are located in the particular pocket.

13. The inventory tracking system of claim 12, further comprising a return signal strength indicator ("RSSI") module that receives RSSI data from the antenna and outputs the RSSI data to the processor.

14. The inventory tracking system of claim 12 wherein the antenna gateway controller comprises a switch located at each opening that is controlled to switch between an open state and a closed state by the gateway switch control signals, wherein the open state switches the opening to the operable state, and wherein the closed state switches the opening to the inoperable state.

15. The inventory tracking system of claim 14, wherein the switch comprises a semiconductor device positioned across the opening, the state of which is controlled by the gateway switch control signals.

16. The inventory tracking system of claim 12, wherein the openings comprise slots, wherein a size of each of the slots is selected to allow radiation of a selected frequency range through the slots.

17. The inventory tracking system of claim 16, wherein multiple slots are aligned with respect to each individual pocket.

18. The inventory tracking system of claim 12 further comprising:
a display device responsive to display signals to visually present information;
a memory in which is stored a position database of positions of each of the pockets of the container and an inventory database of the articles that are expected to be in each of the pockets;
wherein the processor is further programmed to read the position database in the memory to determine the positions of each pocket and determine the actual contents of each pocket;
wherein the processor is further programmed to read the inventory database in the memory to determine the expected contents in each pocket and thereafter to compare the actual contents of each pocket to the expected contents of each pocket to determine if articles should be added to or removed from each pocket; and wherein the processor is further programmed to provide display signals to the display device to control the display device to visually present information describing the articles that should be added to or removed from each pocket.

19. A method for determining the location of an article labeled with an RFID tag, the article being located in a pocket of a container having a plurality of pockets, each pocket having a size, the method comprising:

transmitting a forward radiation beam pattern from an antenna toward an antenna gateway device positioned between the antenna and the pockets of the container, the antenna gateway device having openings aligned with respective pockets, wherein the size of each of the openings is selected to allow radiation of a selected frequency range through the opening, and wherein the openings are controlled by an antenna gateway controller to switch between an operable state and an inoperable state such that when in the operable state, the radiation beam of the antenna at the selected frequency is allowed to radiate through the opening, and when in the inoperable state, the radiation beam of the antenna at the selected frequency is not allowed to radiate through the opening;

sending a first gateway control signal to the antenna gateway controller to switch the opening aligned with a selected pocket of the container into an operable state such that the forward radiation beam pattern of the antenna is allowed to radiate through the opening and read a set of read data from any article labeled with an RFID tag;

alternately sending a second gateway control signal to the antenna gateway controller to switch the remaining openings aligned with the remaining pockets of the container into an inoperable state such that the forward radiation beam pattern of the antenna is not allowed to radiate through the remaining openings; and receiving the set of read data from articles responding to the antenna, sending the set of read data to a processor, and determining that an article identified by the antenna resides in the selected pocket.

20. The method of claim 19, further comprising receiving return signal strength indicator ("RSSI") data into an RSSI module from the antenna and outputting the RSSI data to the processor.

* * * * *